US012754870B2

(12) United States Patent
Wang et al.

(10) Patent No.: US 12,754,870 B2
(45) Date of Patent: Oct. 6, 2026

(54) I2C INTERFACE SYSTEM, DATA WRITING METHOD AND DATA READING METHOD

(71) Applicant: NOREL SYSTEMS LIMITED, Tianjin (CN)

(72) Inventors: Yuanlong Wang, Tianjin (CN); Kuilin Mou, Tianjin (CN)

(73) Assignee: NOREL SYSTEMS LIMITED, Tianjin (CN)

( * ) Notice: Subject to any disclaimer, the term of this patent is extended or adjusted under 35 U.S.C. 154(b) by 69 days.

(21) Appl. No.: 18/799,056

(22) Filed: Aug. 9, 2024

(65) Prior Publication Data

US 2025/0061080 A1 Feb. 20, 2025

(30) Foreign Application Priority Data

Aug. 16, 2023 (CN) ........................ 202311037009.5

(51) Int. Cl.
*G06F 13/14* (2006.01)
*G06F 13/42* (2006.01)

(52) U.S. Cl.
CPC .. *G06F 13/4282* (2013.01); *G06F 2213/0016* (2013.01)

(58) Field of Classification Search
None
See application file for complete search history.

(56) References Cited

U.S. PATENT DOCUMENTS

| | | | | |
|---|---|---|---|---|
| 2020/0012611 | A1* | 1/2020 | Van Bourgognie | H04L 5/14 |
| 2022/0129398 | A1* | 4/2022 | Benjamini | G06F 13/20 |
| 2023/0205723 | A1* | 6/2023 | Takahashi | G06F 13/4022 710/306 |
| 2023/0222085 | A1* | 7/2023 | Bao | G06F 13/4282 710/106 |

OTHER PUBLICATIONS

The I2C-Bus Specification Version 2.1, 2000, Philips Semiconductors.

* cited by examiner

*Primary Examiner* — Henry Tsai
*Assistant Examiner* — Dean Phan
(74) *Attorney, Agent, or Firm* — Troutman Pepper Locke LLP; Tim Tingkang Xia, Esq.

(57) ABSTRACT

The present invention provides an I2C interface system for high-speed long-distance I2C transmission, which includes an I2C interface module and at least one functional module; the I2C interface module is connected with an I2C master controller through an I2C clock line and an I2C data line; the functional module is connected with the I2C interface module. The present invention is suitable for application scenes with a long transmission distance or a large signal interference, and the I2C system used for long-distance transmission has a fast acknowledge speed and a fast transmission speed.

34 Claims, 9 Drawing Sheets

I2C INTERFACE SYSTEM, DATA WRITING METHOD AND DATA READING METHOD

CROSS-REFERENCE TO RELATED APPLICATIONS

This non-provisional application claims priority under 35 U.S.C. § 119(a) on Patent Application No(s). 202311037009.5 filed in China, on Aug. 16, 2023, the entire contents of which are hereby incorporated by reference.

TECHNICAL FIELD

The present invention relates to the technical field of communication, especially to coding and decoding and transmission of physical layer data, and in particular to an I2C interface system for I2C transmission, a data writing method and a data reading method.

BACKGROUND

I2C bus is a simple and bidirectional serial bus developed by the Philips company. Devices interconnected by the I2C bus are called I2C devices, and the interface where an I2C device accesses the I2C bus is called an I2C interface. I2C bus has become a de facto international standard, and the design specification of the I2C bus and its protocols (called standard I2C specification) is usually based on the description of THE I2C-BUS SPECIFICATION VERSION 2.1 Jan. 2000 document.

An I2C interface includes an I2C clock line (generally named after SCL) and an I2C data line (generally named after SDA). An I2C master controller is connected to an I2C interface modules of one or more I2C slave devices through the I2C clock line and I2C data line. The I2C master controller drives the I2C clock line, initiates I2C write operation or read operation, and judges whether data is sent successfully through acknowledge bits. Bit errors on the bus caused by signal interference and other reasons cannot be recognized by I2C slave devices.

The electrical characteristics of the I2C interface require the devices participating in I2C communication to be "common-ground", otherwise it cannot be transmitted, therefore I2C communication is not suitable for application scenarios with a long transmission distance or a large signal interference. In order to solve this problem, devices for forwarding I2C data are usually added to the I2C bus, but there are new problems when forwarding devices are introduced:

the I2C communication mechanism requires that every time the I2C master controller sends a byte, the I2C slave device should reply an acknowledge bit, which is I2C ACK when the acknowledge bit level is low and I2C NAK, and I2C NAK when the acknowledge bit level is high; in the prior art, every byte sent by the I2C master controller will be transmitted to the module that finally receives the data (called the functional module in this invention), and the functional module will generate the acknowledge bit and send it back to the I2C master controller, therefore the acknowledge speed of the transmission system is slow, which leads to a slow transmission speed.

At present, there is a lack of an efficient solution for I2C transmission.

SUMMARY

In order to solve the problem of slow I2C transmission in the prior art, an object of the present invention is to provide an I2C interface system, which includes an I2C interface module and at least one functional module;

the I2C interface module is connected with an I2C master controller through an I2C clock line and an I2C data line; the functional module is connected with the I2C interface module.

Another object of the present invention is to provide an I2C data writing method, which uses an I2C interface system to write data, including:

an I2C master controller initiating an I2C write operation and sending a write command packet to an I2C interface module; the I2C interface module pulling down an I2C clock line level after receiving the write command packet, and sending the write command packet to a functional module;

wherein the write command packet includes a write command length field and a write command data field;

the functional module receiving the write command packet and executing a write command, and returning a write status packet to the I2C interface module after the functional module completes the write command;

when the I2C interface module receives the write status packet and the status information of the write status packet is successful, the I2C interface module stopping pulling down the I2C clock line level and returning I2C ACK to the I2C master controller;

when the I2C interface module receives the write status packet and the status information of the write status packet is failed, the I2C interface module stopping pulling down the I2C clock line level and returning I2C NAK to the I2C master controller.

Preferably, when the data received by the I2C interface module reaches a length indicated by the write command length field, the I2C interface module receiving the write command packet.

Preferably, the write command packet further includes a write command packet check code;

when the data received by the I2C interface module reaches the length indicated by the write command length field and the write command packet check code is verified to be correct, the I2C interface module receiving the write command packet.

Preferably, when the I2C interface module receives the write status packet and the status information of the write status packet is successful, the I2C interface module stopping pulling down the I2C clock line level and returning I2C ACK to the I2C master controller, then the I2C interface module continuing to receive a subsequent I2C operation initiated by the I2C master controller.

Preferably, when the I2C interface module receives the write status packet and the status information of the write status packet is failed, the I2C interface module stopping pulling down the I2C clock line level and returning I2C NAK to the I2C master controller, if the subsequent I2C operation initiated by the I2C master controller is an I2C write operation, the I2C interface module returning I2C NAK to the I2C master controller;

if the subsequent I2C operation initiated by the I2C master controller is an I2C read operation, the I2C interface module returns the status information of the write status packet to the I2C master controller.

Preferably, before the data received by the I2C interface module reaches the length indicated by the write command length field, the I2C interface module receives the I2C START signal or the I2C STOP signal, then the I2C interface module ends the reception of the current write command packet, and the I2C interface module does not receive the write command packet;

if the subsequent I2C operation initiated by the I2C master controller is an I2C write operation, the I2C interface module returns an I2C NAK to the I2C master controller;

if the subsequent I2C operation initiated by the I2C master controller is an I2C read operation, the I2C interface module returns status information to the I2C master controller.

Preferably, when the data received by the I2C interface module reaches the length indicated by the write command length field, but the write command packet check code is verified to be incorrect, the I2C interface module ends the reception of the current write command packet, and the I2C interface module does not receive the write command packet;

if the subsequent I2C operation initiated by the I2C master controller is an I2C write operation, the I2C interface module returns an I2C NAK to the I2C master controller;

if the subsequent I2C operation initiated by the I2C master controller is an I2C read operation, the I2C interface module returns status information to the I2C master controller.

Preferably, the I2C interface module includes a timeout timer;

when the I2C interface module does not receive the write status packet before the timeout, the I2C interface module stops pulling down the I2C clock line level after the timeout, and returns I2C NAK to the I2C master controller;

if the subsequent I2C operation initiated by the I2C master controller is an I2C write operation, the I2C interface module returns I2C NAK to the I2C master controller;

if the subsequent I2C operation initiated by the I2C master controller is an I2C read operation, the I2C interface module returns the status information to the I2C master controller.

Another object of the present invention is to provide an I2C data writing method, which uses an I2C interface system to write data, including:

an I2C master controller initiating an I2C write operation and sending a write command packet to an I2C interface module; the I2C interface module sending the write command packet to a functional module after receiving the write command packet;

wherein the write command packet includes a write command length field and a write command data field;

the functional module receiving the write command packet and executing a write command, and returning a write status packet to the I2C interface module after the functional module completes the write command;

after the I2C interface module receives the write command packet, if a subsequent I2C operation initiated by the I2C master controller is an I2C write operation, and the I2C interface module receives the write status packet returned by the functional module to the I2C interface module and the status information of the write status packet is successful, the I2C interface module receiving the subsequent I2C write operation initiated by the I2C master controller;

if the subsequent I2C operation initiated by the I2C master controller is an I2C write operation, and the I2C interface module receives the write status packet returned by the functional module to the I2C interface module and the status information of the write status packet is failed, the I2C interface module returning I2C NAK to the I2C master controller.

Preferably, when the data received by the I2C interface module reaches the length indicated by the write command length field, the I2C interface module receives the write command packet.

Preferably, the write command packet further includes a write command packet check code;

when the data received by the I2C interface module reaches the length indicated by the write command length field and the write command packet check code is verified to be correct, the I2C interface module receives the write command packet.

Preferably, when the subsequent I2C operation initiated by the I2C master controller is an I2C read operation, after the I2C interface module receives the write status package returned by the functional module to the I2C interface module, the I2C interface module returns the status information of the write status package to the I2C master controller.

Preferably, before the data received by the I2C interface module reaches the length indicated by the write command length field, the I2C interface module receives an I2C START signal or an I2C STOP signal, then the I2C interface module ends the reception of the current write command packet, and the I2C interface module does not receive the write command packet;

if the subsequent I2C operation initiated by the I2C master controller is an I2C write operation, the I2C interface module returns I2C NAK to the I2C master controller;

if the subsequent I2C operation initiated by the I2C master controller is an I2C read operation, the I2C interface module returns status information to the I2C master controller.

Preferably, when the data received by the I2C interface module reaches the length indicated by the write command length field, but the write command packet check code is verified to be incorrect, the I2C interface module ends the reception of the current write command packet, and the I2C interface module does not receive the write command packet;

if the subsequent I2C operation initiated by the I2C master controller is an I2C write operation, the I2C interface module returns I2C NAK to the I2C master controller;

if the subsequent I2C operation initiated by the I2C master controller is an I2C read operation, the I2C interface module returns status information to the I2C master controller.

Preferably, the I2C interface module includes a timeout timer;

when the I2C interface module does not receive the write status packet before the timeout, if the subsequent I2C operation initiated by the I2C master controller is an I2C write operation after the timeout, the I2C interface module returns I2C NAK to the I2C master controller;

when the I2C interface module does not receive the write status packet before the timeout, if the subsequent I2C operation initiated by the I2C master controller is an I2C read operation after the timeout, the I2C interface module returns status information to the I2C master controller.

Preferably, when a subsequent I2C operation initiated by the I2C master controller is an I2C write operation, if the I2C interface module does not receive the write status packet returned by the functional module to the I2C interface module, the I2C interface module pulls down the I2C clock line level;

if the I2C interface module receives the write status packet returned by the functional module to the I2C interface module and the status information of the write status packet is successful, the I2C interface module stops pulling down the I2C clock line level and receives the subsequent I2C write operation initiated by the I2C master controller;

if the I2C interface module receives the write status packet returned by the functional module to the I2C interface module and the status information of the write status packet is failed, the I2C interface module stops pulling down the I2C clock line level and returns I2C NAK to the I2C master controller.

Preferably, when the subsequent I2C operation initiated by the I2C master controller is an I2C read operation, if the I2C interface module does not receive the write status packet returned by the functional module to the I2C interface module, the I2C interface module pulls down the I2C clock line level;

if the I2C interface module receives the write status package returned by the functional module to the I2C interface module, the I2C interface module stops pulling down the I2C clock line level and returns the status information of the write status package to the I2C master controller.

Another object of the present invention is to provide an I2C data reading method, which uses an I2C interface system to read data, including:

an I2C master controller initiating an I2C write operation and sending a read command packet to an I2C interface module; the I2C interface module pulling down an I2C clock line level after receiving the read command packet, and sending the read command packet to a functional module;

wherein the read command packet includes a read command length field and a read command data field;

the functional module receiving the read command packet and executing a read command, and returning a read data packet to the I2C interface module after the functional module completes the read command; wherein the read data packet includes read data; and when the I2C interface module receives the read data packet, the I2C interface module stopping pulling down the I2C clock line level.

Preferably, when the data received by the I2C interface module reaches the length indicated by the read command length field, the I2C interface module receives the read command packet.

Preferably, the read command packet further includes a read command packet check code.

When the data received by the I2C interface module reaches the length indicated by the read command length field and the check code of the read command packet is verified to be correct, the I2C interface module receives the read command packet.

Preferably, when the I2C interface module receives the read data packet, the I2C interface module stops pulling down the I2C clock line level and returns I2C ACK or I2C NAK to the I2C master controller;

If the subsequent I2C operation initiated by the I2C master controller is an I2C write operation, the I2C interface module returns I2C NAK to the I2C master controller;

if a subsequent I2C operation initiated by the I2C master controller is an I2C read operation, the I2C interface module returns read data to the I2C master controller.

Preferably, before the data received by the I2C interface module reaches the length indicated by the read command length field, the I2C interface module receives an I2C START signal or tan I2C STOP signal, then the I2C interface module ends the reception of the current read command packet, and the I2C interface module does not receive the read command packet;

if the subsequent I2C operation initiated by the I2C master controller is an I2C write operation, the I2C interface module returns I2C NAK to the I2C master controller;

if the subsequent I2C operation initiated by the I2C master controller is an I2C read operation, the I2C interface module returns status information to the I2C master controller.

Preferably, when the data received by the I2C interface module reaches the length indicated by the read command length field, but the check code of the read command packet is verified to be incorrect, the I2C interface module ends the reception of the current read command packet, and the I2C interface module does not receive the read command packet;

if the subsequent I2C operation initiated by the I2C master controller is an I2C write operation, the I2C interface module returns I2C NAK to the I2C master controller;

if the subsequent I2C operation initiated by the I2C master controller is an I2C read operation, the I2C interface module returns status information to the I2C master controller.

Preferably, the I2C interface module includes a timeout timer;

when the I2C interface module does not receive the read data packet before the timeout, after the timeout, the I2C interface module stops pulling down the I2C clock line level and returns I2C NAK to the I2C master controller;

if the subsequent I2C operation initiated by the I2C master controller is an I2C write operation, the I2C interface module returns I2C NAK to the I2C master controller;

if the subsequent I2C operation initiated by the I2C master controller is an I2C read operation, the I2C interface module returns status information to the I2C master controller.

Preferably, the read data includes data read from the functional module, or read status information generated by the functional module executing the read command, or both data read from the functional module and read status information generated by the functional module executing the read command.

Another object of the present invention is to provide an I2C data reading method, which uses an I2C interface system to read data, including:

an I2C master controller initiating an I2C write operation and sending a read command packet to an I2C interface module; the I2C interface module sending the read command packet to a functional module after receiving the read command packet;

wherein the read command packet includes a read command length field and a read command data field;

the functional module receiving the read command packet and executing a read command, and returning a read data packet to the I2C interface module after the functional module completes the read command; wherein the read data packet includes read data;

after the I2C interface module receives the read command packet, if the subsequent I2C operation initiated by the I2C master controller is an I2C write operation, and the I2C interface module receives the read data packet returned by the functional module to the I2C interface module, the I2C interface module returning an I2C NAK to the I2C master controller;

if the subsequent I2C operation initiated by the I2C master controller is an I2C read operation, and the I2C interface module receives the read data packet returned by the functional module to the I2C interface module, the I2C interface module returning the read data to the I2C master controller.

Preferably, when the data received by the I2C interface module reaches the length indicated by the read command length field, the I2C interface module receives the read command packet.

Preferably, the read command packet further includes a read command packet check code.

When the data received by the I2C interface module reaches the length indicated by the read command length field and the check code of the read command packet is verified to be correct, the I2C interface module receives the read command packet.

Preferably, before the data received by the I2C interface module reaches the length indicated by the read command length field, the I2C interface module receives an I2C START signal or an I2C STOP signal, then the I2C interface module ends the reception of the current read command packet, and the I2C interface module does not receive the read command packet;

if a subsequent I2C operation initiated by the I2C master controller is an I2C write operation, the I2C interface module returns I2C NAK to the I2C master controller;

if the subsequent I2C operation initiated by the I2C master controller is an I2C read operation, the I2C interface module returns status information to the I2C master controller.

Preferably, when the data received by the I2C interface module reaches the length indicated by the read command length field, but the check code of the read command packet is verified to be incorrect, the I2C interface module ends the reception of the current read command packet, and the I2C interface module does not receive the read command packet;

if the subsequent I2C operation initiated by the I2C master controller is an I2C write operation, the I2C interface module returns I2C NAK to the I2C master controller;

if the subsequent I2C operation initiated by the I2C master controller is an I2C read operation, the I2C interface module returns status information to the I2C master controller.

Preferably, the I2C interface module includes a timeout timer;

when the I2C interface module does not receive the read data packet before the timeout, if the subsequent I2C operation initiated by the I2C master controller is an I2C write operation after the timeout, the I2C interface module returns I2C NAK to the I2C master controller;

when the I2C interface module does not receive the read data packet before the timeout, if the subsequent I2C operation initiated by the I2C master controller is an I2C read operation after the timeout, the I2C interface module returns the status information to the I2C master controller.

Preferably, the read data includes data read from the functional module, or read status information generated by the functional module executing the read command, or both data read from the functional module and read status information generated by the functional module executing the read command.

Preferably, when the subsequent I2C operation initiated by the I2C master controller is an I2C write operation, if the I2C interface module does not receive the read data packet returned by the functional module to the I2C interface module, the I2C interface module pulls down the I2C clock line level;

if the I2C interface module receives the read data packet returned by the functional module to the I2C interface module, the I2C interface module stops pulling down the I2C clock line level, and the I2C interface module returns I2C NAK to the I2C master controller.

Preferably, when the subsequent I2C operation initiated by the I2C master controller is an I2C read operation, if the I2C interface module does not receive the read data packet returned by the functional module to the I2C interface module last time, the I2C interface module pulls down the I2C clock line level;

if the I2C interface module receives the read data packet returned by the functional module to the I2C interface module, the I2C interface module stops pulling down the I2C clock line level and returns the read data to the I2C master controller.

The I2C interface system, data writing method and data reading method for efficiently transmitting I2C provided by the present invention are suitable for application scenarios with long transmission links, and are also compatible with local applications with short transmission links, thus providing an ideal solution for I2C transmission.

BRIEF DESCRIPTION OF DRAWINGS

In order to explain the specific embodiment of the present invention or the technical solution in the prior art more clearly, the drawings needed in the description of the specific embodiment or the prior art will be briefly introduced below. Obviously, the drawings in the following description are some embodiments of the present invention, and other drawings can be obtained according to these drawings without creative work for those skilled in the art.

Figure 1:
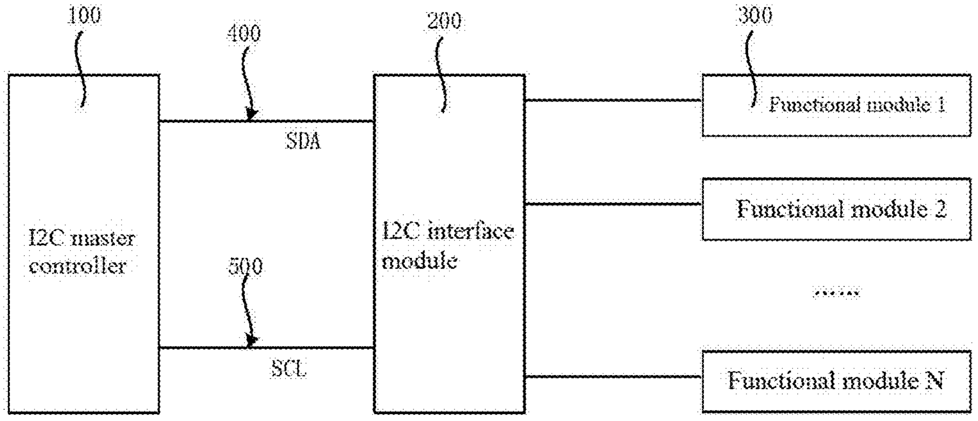
FIG. 1 schematically shows a schematic diagram of an I2C interface system for high-speed long-distance I2C transmission in the present invention.

The reference signs in the above drawings have the following meanings:

100: I2C master controller; 200: I2C interface module; 300: Functional module; 400: I2C data line (SDA); 500: I2C clock line (SCL);

S: which indicates I2C START signal, and the corresponding I2C bus state is that SDA jumps from high level to low level when SCL is high level;

P: which indicates I2C STOP signal, and the corresponding I2C bus state is that SDA jumps from low level to high level when SCL is high level;

Sr: the corresponding I2C bus state is the same as S;

Sr/P: the corresponding I2C bus state is Sr or P;

ADDR: I2C address;

R/W: which indicates the reading and writing operation indication bit. When this bit is R, it indicates the current I2C reading operation, and when this bit is W, it indicates the current I2C writing operation;

R: which indicates the read operation instruction bit, and the corresponding I2C bus state is when SCL is at high level and SDA is at high level;

W: which indicates the writing instruction bit, and the corresponding I2C bus state is when SCL is at high level and SDA is at low level;

BYTE: write operation data (shaded) or read operation data (unshaded), usually a multi-byte sequence, and the content in parentheses after it indicates the serial number of the byte in the sequence; a write command packet or read command packet is sent through the write operation data, and the read data or status information are read through the read operation data, and the smaller serial number value is sent first;

A: which indicates I2C ACK, and the corresponding I2C bus state is that SDA is always low when SCL is high;

N: which indicates I2C NAK, and the corresponding I2C bus state is that SDA is always high when SCL is high;

DATA: bytes containing read data, and a sequence consisting of I2C ACK/I2C NAK between bytes;

STATUS: bytes containing status information, and a sequence consisting of I2C ACK/I2C NAK between bytes;

A/N: the corresponding I2C bus state is that SDA is always high or always low when SCL is high;

HOLD: SCL is a continuous low level;

CRC: write command packet check code or read command packet check code;

IDLE: the corresponding I2C bus state includes the following two possibilities:

(1) SCL and SDA are both at high level;

(2) SCL and SDA may have other level states, but there is no legitimate I2C operation in the combination of these level states; when IDLE is about to end, SCL and SDA are both at high levels.

DESCRIPTION OF EMBODIMENTS

In order to make the above and other features and advantages of the present invention more clear, the present invention will be further described with reference to the accompanying drawings. It should be understood that the specific embodiments given here are for the purpose of explaining to those skilled in the art, and are only illustrative and not restrictive.

Clock line (SCL) and I2C data line (SDA) are collectively called an I2C bus, which has become a de facto international standard. The design specification of I2C bus and its protocols (called standard I2C specification) is usually based on the description in THE I2C-BUS SPECIFICATION VERSION 2.1 Jan. 2000.

As shown in FIG. 1, according to an embodiment of the present invention, an I2C interface system for efficient I2C transmission is provided, which includes an I2C interface module 200 and at least one functional module 300.

The I2C interface module 200 is connected to the I2C master controller 100 through an I2C clock line 500 (SCL) and an I2C data line 400 (SDA), and the functional module 300 is connected to the I2C interface module 200. The I2C interface module 200 can be connected with a plurality of functional modules 300, such as a functional module 1, a functional module 2, . . . , and a functional module N. In this embodiment, the I2C interface module 200 is connected to a functional module 300 as an example.

The present invention does not limit the connection mode between the I2C interface module 200 and the functional module 300, the I2C interface module 200 can be connected to one or more functional modules 300 through one or more transmission lines. Meanwhile, the present invention does not limit the location of the I2C interface module 200 and functional module 300, and the I2C interface module 200 and the functional modules 300 can be located in the same integrated circuit chip, or in different integrated circuit chips on a PCB, or the I2C interface module 200 and the functional modules 300 can also be located in different system devices.

An I2C master controller 100 can be connected to one or more I2C interface modules 200 through the same I2C bus (clock line 500 and I2C data line 400) and transmit byte sequences carrying information through an I2C read operation or I2C write operation. In this embodiment, description will be made by taking the I2C master controller 100 connected to the I2C interface module 200 through the same I2C bus (clock line 500 and I2C data line 400) as example.

Figure 2:
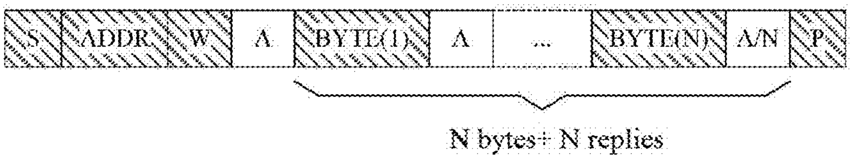
FIG. 2 shows a timing diagram of the I2C write operation of the present invention.

As shown in FIG. 2, an I2C write operation includes a write address byte and one or more write operation data bytes (BYTE (1), . . . , BYTE (N), which are shaded). The write address byte is the first byte to be sent, and the write address byte includes an I2C address (ADDR) and a write operation indication bit (W), which is at a low level according to the standard I2C specification.

In this embodiment, both the write address byte and the write operation data byte are 8 bits, in which the write address byte contains 7 bits of I2C address (ADDR) and 1 bit of write operation indication bit (W). The present invention does not limit the number of bits of the write address byte and the write operation data byte, and in other embodiments, the write address byte and the write operation data byte can be other bits.

When the I2C master controller 100 initiates an I2C write operation, the I2C master controller 100 first drives the I2C clock line 500 and the I2C data line 400 according to the standard I2C specification to generate an I2C START signal (S), and then sends a write address byte. After receiving the write address byte, the I2C interface module 200 drives the I2C data line 400 to generate an acknowledge bit. According to the standard I2C specification, the acknowledge bit can be I2C ACK (I2C data line level is low) or I2C NAK (I2C data line level is high).

When the acknowledge bit of the write address byte is I2C ACK, the I2C master controller 100 can send one or more write operation data bytes, and the I2C interface module 200 drives the I2C data line 400 to generate the acknowledge bit after receiving each write operation data byte, and the acknowledge bit of the write operation data byte can be I2C ACK (I2C data line level is low) or I2C NAK (I2C data line level is high).

According to the standard I2C specification, when sending a write address byte and one or more write operation data bytes, the I2C master controller 100 sends the number of bits contained in the write address byte and the write operation data byte by driving the I2C data line 400, and drives the I2C clock line 500 to generate a clock pulse for each bit contained in the write address byte and the write operation data byte.

According to the standard I2C specification, the I2C master controller 100 will also drive the I2C clock line 500 to generate a clock pulse corresponding to the acknowledge bit of the write address byte and the acknowledge bit of the write operation data byte. The I2C master controller 100 ends the current write operation by sending an I2C STOP signal (P) or an I2C START signal(S) defined by the standard I2C specification.

Figure 3:
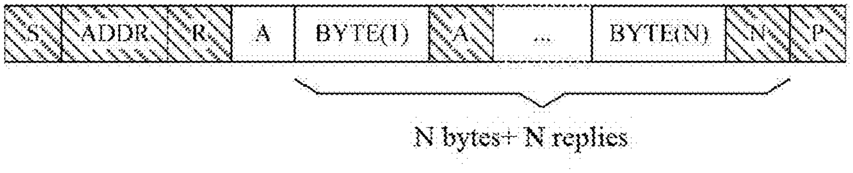
FIG. 3 shows a timing diagram of the I2C read operation of the present invention.

As shown in FIG. 3, an I2C read operation includes a read address byte and one or more read operation data bytes (BYTE (1), . . . , BYTE (N), without shading), wherein the read address byte is the first byte sent by the I2C master controller 100, and one or more read operation data bytes are sent by the I2C interface module 200, and the read address byte includes an I2C address (ADDR) and a read operation indication bit (R). According to the standard I2C specification, the read operation indication bit (R) is at a high level.

In this embodiment, both the read address byte and the read operation data byte are 8 bits, in which the read address byte contains 7 bits of I2C address (ADDR) and 1 bit of read operation indication bit (R). The present invention does not limit the number of bits of the read address byte and the read operation data byte, and in other embodiments, the read address byte and the read operation data byte can be other bits.

When the I2C master controller 100 initiates an I2C read operation, the I2C master controller 100 first drives the I2C clock line 500 and the I2C data line 400 according to the standard I2C specification to generate an I2C START signal (S), and then sends a read address byte. After receiving the read address byte, the I2C interface module 200 drives the I2C data line 400 to generate an acknowledge bit, which can be I2C ACK (I2C data line level is low) or I2C NAK (I2C data line level is high) according to the standard I2C specification.

When the acknowledge bit of the read address byte is I2C ACK, the I2C interface module 200 can return one or more read operation data bytes by driving the I2C data line 400. After receiving each read operation data byte, the I2C master controller 100 drives the I2C data line to generate the acknowledge bit, and the acknowledge bit of the read operation data byte can be I2C ACK (the I2C data line level is low) or I2C NAK (the I2C data line level is high).

According to the standard I2C specification, when the I2C master controller 100 sends a read address byte and the I2C interface module 20 returns one or more read operation data bytes, the I2C master controller 100 sends the number of bits contained in the read address byte by driving the I2C data line 400, and the I2C interface module 200 returns the bits contained in the read operation data byte by driving the I2C data line 400, and I2C master controller 100 drives the I2C clock line 500 to generate a clock pulse for each bit contained in the read address byte and the read operation data byte.

According to the standard I2C specification, the I2C master controller 100 will also drive the I2C clock line 500 to generate a clock pulse corresponding to the acknowledge bit of the read address byte and the acknowledge bit of the read operation data byte. The I2C master controller 100 ends the current read operation by sending an I2C STOP signal (P) or an I2C START signal(S) defined by the standard I2C specification.

An I2C write operation or I2C read operation cycle starts with the I2C START signal(S), but there are two ways to end it. The first way is to end it with the I2C STOP signal (P), and the timing is shown in FIG. 2 and FIG. 3 respectively.

Figure 4:
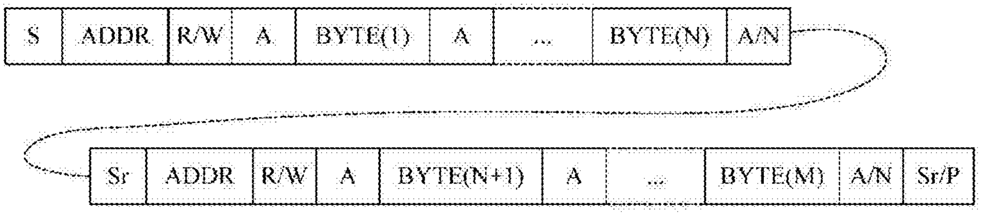
FIG. 4 shows a timing diagram of the I2C continuous read-write operation of the present invention.

The second is to generate a new I2C START signal(S) and proceed to the next I2C write operation or I2C read operation. The timing is shown in FIG. 4. The dotted line between the acknowledge bit (A/N) and the I2C START signal (Sr) in FIG. 4 (such lines in other figures) is split into multiple lines because the timing diagram is too long to be described in the same line, indicating that there is a connection relationship between the two timing diagrams.

Using any of the above termination methods will not affect the data writing method and data reading method of the present invention. For convenience of description, the termination of an I2C operation (I2C write operation or I2C read operation) is described in this embodiment with an I2C STOP signal (P).

First working mode of data writing method.

According to an embodiment of the present invention, there is provided an I2C data writing method, which uses the I2C interface system provided by the present invention to write data, including:

the I2C master controller 100 initiates an I2C write operation and sends a write command packet to the I2C interface module 200; the I2C interface module 200 pulls down the I2C clock line 500 level after receiving the write command packet and sends the write command packet to the functional module 300.

The functional module 300 receives the write command packet and executes a write command. When the functional module 300 completes the write command, it returns the write status packet to the I2C interface module 200.

When the I2C interface module 200 receives the write status packet and the status information of the write status packet is successful, the I2C interface module 200 stops pulling down the I2C clock line 500 level and returns I2C ACK to the I2C master controller 100.

When the I2C interface module 200 receives the write status packet and the status information of the write status packet is failed, the I2C interface module 200 stops pulling down the I2C clock line 500 level and returns I2C NAK to the I2C master controller 100.

The write command packet of the present invention is sent by write operation data bytes (BYTE (1), . . . , BYTE (N), which are shaded), and the write command packet includes a write command length field and a write command data field.

The write command data field of the present invention contains the write command, and the write command packet is used to be distinguished from the read command packet.

The read command packet of the present invention is also sent through write operation data bytes (BYTE (1), . . . , BYTE (N), shaded), and the read command packet includes a read command length field and a read command data field, and the read command data field contains a read command.

For example, when the I2C master controller 100 initiates a write command packet, the I2C master controller 100 initiates an I2C write operation to send a write address byte and one or more write operation data bytes (BYTE (1), . . . , BYTE (N), shaded) including the write command packet to the I2C interface module 200. When the I2C master controller 100 initiates a read command packet, the I2C master controller 100 initiates an I2C write operation to send a write address byte and one or more write operation data bytes (BYTE (1), . . . , BYTE (N), shaded) including the read command packet to the I2C interface module 200.

The I2C interface module 200 has a logic circuit of an I2C interface, and the I2C interface module 200 receives and responds to data from the I2C master controller 100. The I2C interface modules 200 and I2C master controller 100 are interconnected by an I2C bus (a clock line 500 and an I2C data line 400). One I2C master controller 100 is connected to one or more I2C interface modules 200, and each I2C interface module 200 has a unique I2C address (ADDR) on its I2C bus (clock line 500 and I2C data line 400). According to the standard I2C specification, each I2C write operation or I2C read operation except I2C write broadcast is only for one I2C address (ADDR), and the I2C interface module 100 using other I2C addresses does not participate in the I2C write operation or I2C read operation.

Figure 5:
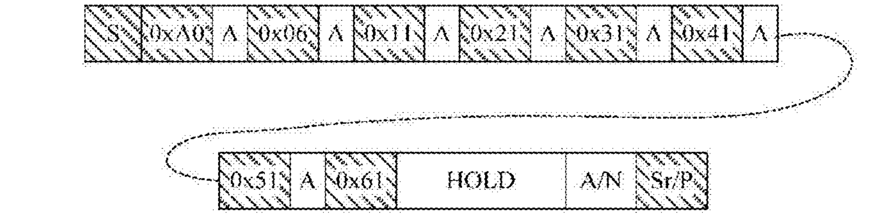
FIG. 5 shows the timing diagram of sending a write command packet (or a read command packet) by initiating an I2C write operation according to the present invention.

With reference to FIG. 5, in a specific embodiment, the I2C interface module 200 has an I2C address 0x50 with a length of 7 bits (corresponding to the address byte 0xA0 or the binary value of 1010000), and the I2C master controller 100 initiates an I2C write operation to write to the I2C interface module 200 with write operation data of a total length of 7 bytes: 0x06, 0x11, 0x21, 0x31, 0x41, 0x51 and 0x61 in turn, the 7 bytes of write operation data containing a write command packet. The 0xA0 byte corresponds to the write address byte, with its upper 7 bits corresponding to the I2C address (ADDR) of the I2C interface module 200, and its lower 1 bit being the write operation indication bit (W), and the value of the write operation indication bit (W) is 0, indicating that it is currently a write operation, and the value of this byte is 10100000 in binary, that is, 0xA0 in hexadecimal.

The write command packet includes a write command length field and a write command data field.

The 0x06 byte corresponds to the write command length field, which is represented by 1 byte in this embodiment, and can be represented by multiple bytes in other embodiments.

The bytes 0x11, 0x21, 0x31, 0x41, 0x51 and 0x61 correspond to the write command data fields. In this embodiment, the write command data fields are 6 bytes in total. When the I2C interface module 200 receives the last bit of 0x61 byte, that is, when the data received by the I2C interface module 200 reaches the length indicated by the write command length field, the I2C interface module 200 receives the write command packet.

In the embodiment shown in FIG. 5, the value of the write command length field (0x06) is equal to the length of the write command data field, and the data received by the I2C interface module 200 reaches the length indicated by the write command length field, which means that the I2C interface module 200 receives all the data of the write command data field until the last byte, 0x61, of the write command data field.

In another embodiment of the present invention, the value of the write command length field can also be defined in advance to be equal to the length of the write command packet (including the length occupied by the write command length field and the length of the write command data field); the data received by the I2C interface module 200 reaches the length indicated by the write command length field, which means that the I2C interface module 200 receives all the data of the write command packet (including the write command length field and the write command data field).

The value of the write command length field can also be predefined to include some or all of the following data fields: write address byte, write command length field, write command data field, write command packet check code (described below in this document), etc.

The present invention does not limit the content contained in the value of the write command length field, and the preset definition of the content contained in the value of the write command length field only needs to enable the I2C interface module 200 to receive all the data of the write command packet according to the preset definition. The data received by the I2C interface module 200 reaches the length indicated by the write command length field, which means that the I2C interface module 200 receives all the data of the write command packet.

In the embodiment shown in FIG. 5, the I2C interface module 200 receives the last bit of 0x61 bytes, that is, the data received by the I2C interface module 200 reaches the length indicated by the write command length field, the I2C interface module 200 receives the write command packet, the I2C interface module 200 pulls down the I2C clock line 500 level, the I2C bus is in the HOLD state (A continuous low level state), and the I2C interface module 200 sends the write command packet to the functional module 300. The functional module 300 receives the write command packet and executes the write command, and when the functional module 300 completes the write command, it returns a write status packet to the I2C interface module 200.

In the present invention, when the I2C interface module 200 sends the write command packet to the functional module 300, the contents in the write command packet can be modified, added or deleted, which is not limited or specified by the present invention.

When the I2C interface module 200 receives the write status packet and the status information of the write status packet is successful, the I2C interface module 200 stops pulling down the I2C clock line 500 level and returns the I2C ACK to the I2C master controller 100.

When the I2C interface module 200 receives the write status packet and the status information of the write status packet is failed, the I2C interface module 200 stops pulling down the I2C clock line 500 level and returns the I2C NAK to the I2C master controller 100.

It should be noted that the data structure of the write command packet of the present invention is not specifically limited. For example, in some embodiments, the length of the write command length field can be one byte or two or more bytes, and the present invention does not limit the content of the value of the write command length field. Specifically, through the agreement between the I2C master controller 100 and the I2C interface module 200, as long as the write command packet includes the write command length field and the write command data field, and the I2C interface module 200 can receive all the data of the write command packet according to the preset definition of the value of the write command length field. In the following embodiments, the length of the write command length field is still one byte, and the value of the write command length field is equal to the length of the write command data field.

According to the embodiment of the present invention, the write command packet further includes a write command packet check code. If the data received by the I2C interface module 200 reaches the length indicated by the write command length field and the write command packet check code is verified to be correct, the I2C interface module 200 receives the write command packet.

Figure 6:
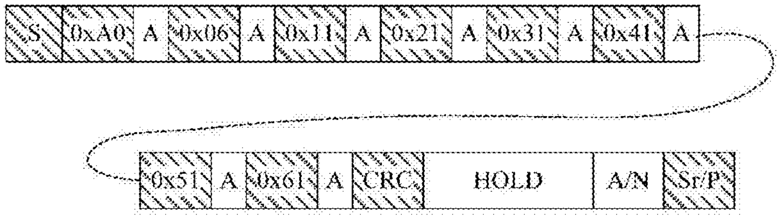
FIG. 6 shows a timing diagram of the present invention for initiating an I2C write operation to send a write command packet (or a read command packet) with a check code.

As shown in FIG. 6, a byte of write command packet check code (CRC) is added to the write command packet. The present invention does not limit the generation algorithm of the write command packet check code, and in some embodiments, the length of the write command packet check code is not limited to one byte. In the following embodiments, a write command packet check code with a length of one byte is exemplarily used, and it is marked by the English abbreviation CRC of the cyclic redundancy check code.

The I2C master controller 100 initiates an I2C write operation. After receiving the write command length field (0x06), the I2C interface module 200 can judge that the I2C master controller 100 will sequentially write a write command data field with a length of 6 bytes, i.e., 0x11, 0x21, 0x31, 0x41, 0x51, 0x61, and a write command packet check code (CRC) with a length of 1 byte.

After receiving the write command length field (0x06), the I2C interface module 200 counts the bytes of the received write command data field, and after receiving the last byte 0x61 of the write command data field, it calculates the write command packet check code (CRC) by using the six bytes of 0x11, 0x21, 0x31, 0x41, 0x51 and 0x61. When the I2C interface module 200 receives the write command packet check code (CRC), it compares the received write command packet check code (CRC) with the calculated write command packet check code. If they are consistent, the data received by the I2C interface module 200 reaches the length indicated by the write command length field in the write command packet, and the write command packet check code is verified to be correct, and the I2C interface module 200 receives the write command packet.

The present invention does not limit the data on which the write command packet check code (CRC) is calculated. For example, other data besides the write command data field can also be used for the calculation of the write command packet check code (CRC), including but not limited to the write address byte, the write command length field, and the like.

As shown in FIG. 6, after the I2C interface module 200 receives the write command packet, the I2C interface module 200 pulls down the I2C clock line 500 level, and the I2C bus is in the HOLD state (continuous low level state), and the I2C interface module 200 sends the write command packet to the functional module 300. The functional module 300 receives the write command packet and executes the write command. When the functional module 300 completes the write command, it returns the write status packet to the I2C interface module 200.

According to the embodiment of the present invention, when the I2C interface module 200 receives the write status packet and the status information of the write status packet is successful, the I2C interface module 200 stops pulling down the I2C clock line level and returns I2C ACK to the I2C master controller 100.

When the I2C interface module 200 receives the write status packet and the status information of the write status packet is failed, the I2C interface module 200 stops pulling down the I2C clock line 500 level and returns I2C NAK to the I2C master controller 100.

The subsequent I2C operation referred to in the present invention refers to the I2C operation before it, and the I2C operation can be an I2C write operation or an I2C read operation.

Figure 7:
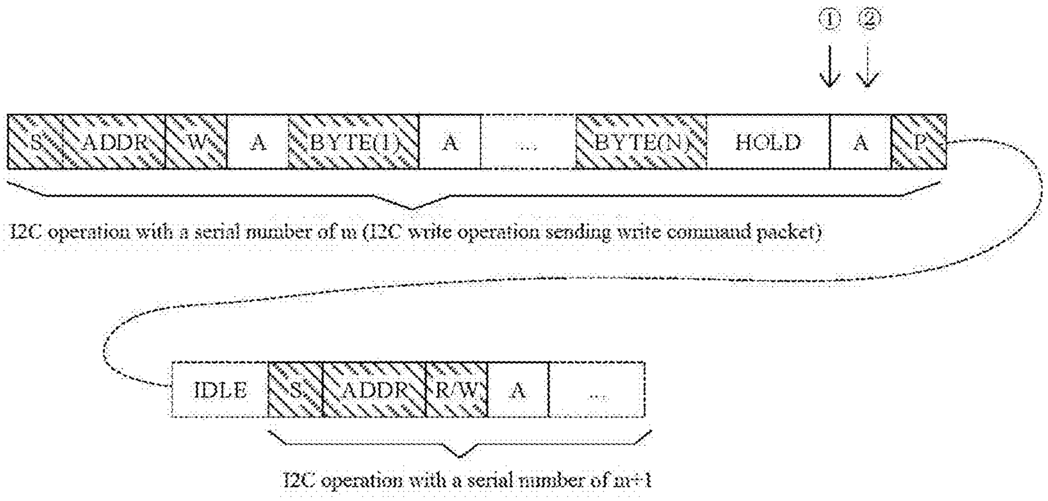
FIG. 7 shows a timing diagram in which an I2C write operation is initiated to send a write command packet and the status information of the write status packet is successful in the first working mode of the data write method of the present invention.

For example, as shown in FIG. 7, the I2C master controller 100 initiates an I2C operation (I2C write operation) with a serial number of m (m is a natural number), and the I2C operation with a serial number of m+1 initiated by the I2C master controller 100 is a subsequent I2C operation (relative to the I2C operation with a serial number of m).

The embodiment shown in FIG. 7 sends a write command packet through an I2C write operation with a serial number of m, and the I2C interface module 200 pulls down the I2C clock line 500 level after receiving the write command packet (after receiving BYTE (N)).

At the ① moment, the I2C interface module 200 receives the write status packet and the status information of the write status packet is successful. The I2C interface module 200 stops pulling down the I2C clock line 500 level and terminates the HOLD state (terminating the continuous low-level state).

At the ② moment, the I2C interface module 200 returns I2C ACK to the I2C master controller 100, and the I2C master controller 100 terminates the I2C operation with a serial number of m (I2C write operation) and initiates the I2C operation with a serial number of m+1 (a subsequent I2C operation), and the subsequent I2C operation is an I2C write operation or I2C read operation.

After the I2C interface module 200 returns the I2C ACK in the I2C operation with a serial number of m, it continues to receive the subsequent I2C operation initiated by the I2C master controller 100 (that is, it returns the I2C ACK after receiving the read address byte or write address byte in the I2C operation with a serial number of m+1 and continues the I2C operation with a serial number of m+1), and repeats the above process, so that the I2C master controller 100 continuously initiates the I2C operation.

According to the embodiment of the present invention, when the I2C interface module 200 receives the write status packet and the status information of the write status packet is failed, the I2C interface module 200 stops pulling down the I2C clock line 500 level and returns I2C NAK to the I2C master controller 100.

If the subsequent I2C operation initiated by the I2C master controller 100 is an I2C write operation, the I2C interface module 200 returns I2C NAK to the I2C master controller 100.

If the subsequent I2C operation initiated by the I2C master controller 100 is an I2C read operation, the I2C interface module 200 returns the status information of the write status packet to the I2C master controller 100.

Figure 8:
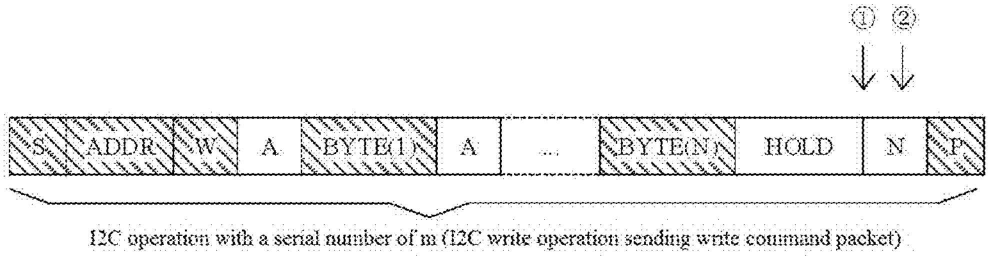
FIG. 8 shows a timing diagram in which an I2C write operation is initiated to send a write command packet and the status information of the write status packet is failed in the first working mode of the data write method of the present invention.

For example, as shown in FIG. 8, the I2C operation with a serial number of m initiated by the I2C master controller 100 is an I2C write operation, and the I2C interface module 200 pulls down the I2C clock line 500 level after receiving the write command packet (after receiving BYTE (N)).

At the ① moment, the I2C interface module 200 receives the write status packet and the status information of the write status packet is failed. The I2C interface module 200 stops pulling down the I2C clock line 500 level and terminates the HOLD state (terminating the continuous low-level state).

At the ② moment, the I2C interface module 200 returns the I2C NAK to the I2C master controller 100, and the I2C master controller 100 terminates the I2C operation (I2C write operation) with a serial number of m.

Figure 10:
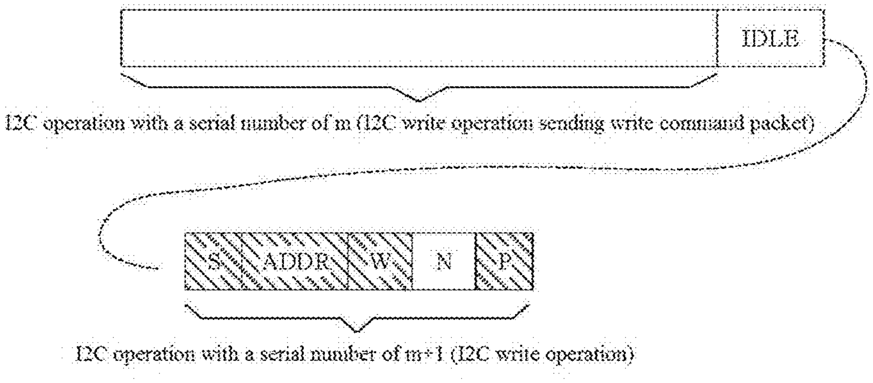
FIG. 10 shows the timing chart when the current I2C write operation is abnormal and the subsequent I2C write operation is I2C write operation.

As shown in FIG. 10, after the I2C master controller 100 terminates the I2C operation (I2C write operation) with a serial number of m (the I2C operation with a serial number of m is shown in FIG. 8), if the I2C operation (a subsequent I2C operation) initiated by the I2C master controller 100 with a serial number of m+1 is an I2C write operation, the I2C interface module 200 returns the I2C NAK to the I2C master controller 100 after receiving the write address byte, so that the I2C operation (the subsequent I2C operation/I2C write operation) with a serial number of m+1 is terminated.

Figure 11:
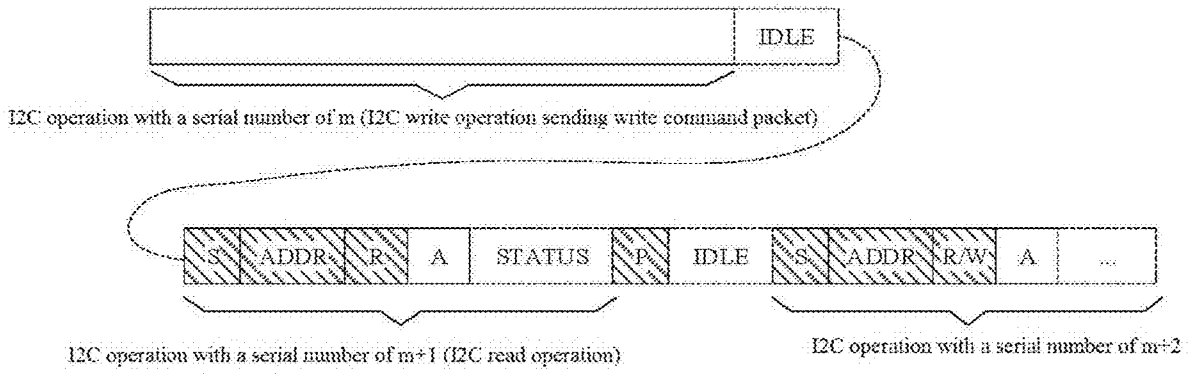
FIG. 11 shows the timing chart when the current I2C write operation is abnormal and the subsequent I2C operation is an I2C read operation.

As shown in FIG. 11, after the I2C master controller 100 terminates the I2C operation (I2C write operation) with a serial number of m (the I2C operation with a serial number of m is shown in FIG. 8), if the I2C operation (subsequent I2C operation) with a serial number of m+1 initiated by the I2C master controller 100 is an I2C read operation, after the I2C interface module 200 receives the read address byte, the I2C interface module 200 returns the I2C ACK to the I2C master controller 100 and continues to return the status information (STATUS) of the write status packet, so that the I2C master controller 100 continues to perform the I2C operation with a serial number of m+1 (subsequent I2C operation/I2C read operation).

The I2C master controller 100 reads the STATUS information of the write status packet while continuing the I2C operation (subsequent I2C operation/I2C read operation) with a serial number of m+1.

After completing the I2C operation with a serial number of m+1 (subsequent I2C operation/I2C read operation), the I2C master controller 100 initiates the I2C operation with a serial number of m+2.

After completing the I2C operation with a serial number of m+1 (subsequent I2C operation/I2C read operation), the I2C interface module 200 continues to receive the I2C operation with a serial number of m+2 initiated by the I2C master controller 100 (that is, the I2C interface module 200 returns to the I2C ACK after receiving the read address byte or write address byte in the I2C operation with a serial number of m+2 and continues the I2C operation with a serial number of m+2), and repeats the above process, and the I2C master controller 100 continuously initiates the I2C operation.

According to the embodiment of the present invention, before the data received by the I2C interface module 200 reaches the length indicated by the write command length field, the I2C interface module 200 receives the I2C START signal or the I2C STOP signal, then the I2C interface module 200 ends the reception of the current write command packet, and the I2C interface module 200 does not receive the write command packet.

If the subsequent I2C operation initiated by the I2C master controller 100 is an I2C write operation, the I2C interface module 200 returns an I2C NAK to the I2C master controller 100.

If the subsequent I2C operation initiated by the I2C master controller 100 is an I2C read operation, the I2C interface module 200 returns status information to the I2C master controller. In this case, the I2C interface module 200 has not received a write command packet, therefore the I2C interface module 200 will not send a write command packet to the functional module 300 or receive a write status packet from the functional module 300. Therefore, the status information returned by the I2C interface module 200 to the I2C master controller 100 does not come from the write status packet. The present invention does not specify the status information returned by the I2C interface module 200 to the I2C master controller 100 in this example, but in some embodiments, the status information may include but is not limited to the information indicating that the I2C interface module 200 has not received the write command packet.

For example, as shown in FIGS. 10 and 11, the I2C operation with a serial number of m initiated by the I2C master controller 100 is an I2C write operation, and the I2C master controller 100 sends a write command packet through the I2C write operation. In this example, the data received by the I2C interface module 200 in the I2C write operation with a serial number of m does not reach the length indicated by the write command length field. Before the data received by the I2C interface module 200 reaches the length indicated by the write command length field, the I2C interface module 200 receives the I2C START signal or the I2C STOP signal, and the I2C interface module 200 ends the reception of the current write command packet, and the I2C interface module 200 does not receive the write command packet.

The I2C master controller 100 terminates the I2C operation with a serial number of m (I2C write operation), and the I2C master controller 100 initiates the I2C operation with a serial number of m+1 (subsequent I2C operation). The process of the I2C operation (subsequent I2C operation) initiated by the I2C master controller 100 with a serial number of m+1 is the same as that in the above, and will not be described here again.

According to the embodiment of the present invention, when the data received by the I2C interface module 200 reaches the length indicated by the write command length field, but the write command packet check code is verified to be incorrect, the I2C interface module 200 ends the reception of the current write command packet, and the I2C interface module 200 does not receive the write command packet.

If the subsequent I2C operation initiated by the I2C master controller 100 is an I2C write operation, the I2C interface module 200 returns an I2C NAK to the I2C master controller 100.

If the subsequent I2C operation initiated by the I2C master controller 100 is an I2C read operation, the I2C interface module 200 returns status information to the I2C master controller 100. In this case, the I2C interface module 200 has not received a write command packet, therefore the I2C interface module 200 will not send a write command packet to the functional module 300 or receive a write status packet from the functional module 300. Therefore, the status information returned by the I2C interface module 200 to the I2C master controller 100 does not come from the write status packet. The present invention does not specify the status information returned by the I2C interface module 200 to the I2C master controller 100 in this example, but in some embodiments, the status information may include but is not limited to the information indicating that the I2C interface module 200 has not received the write command packet.

For example, as shown in FIGS. 10 and 11, the I2C operation with a serial number of m initiated by the I2C master controller 100 is an I2C write operation, and the I2C master controller 100 sends a write command packet through the I2C write operation. In this case, the data received by the I2C interface module 200 in the I2C write operation with a serial number of m reaches the length indicated by the write command length field, but the write command packet check code is verified to be incorrect, therefore the I2C interface module 200 ends the reception of the current write command packet, and the I2C interface module 200 does not receive the write command packet.

The I2C master controller 100 terminates the I2C operation with a serial number of m (I2C write operation), and the I2C master controller 100 initiates the I2C operation with a serial number of m+1 (subsequent I2C operation). The process of the I2C operation (subsequent I2C operation) initiated by the I2C master controller 100 with a serial number of m+1 is the same as that in the above, and will not be described here again.

According to an embodiment of the present invention, the I2C interface module 200 includes a timeout timer.

The I2C master controller 100 sends a write command packet through I2C write operation, and the I2C interface module 200 sends the write command packet to the functional module 300 after receiving the write command packet. The I2C interface module 200 continuously waits for the write status packet returned by the functional module 300 and the timeout timer performs timing.

When the I2C interface module 200 does not receive the write status packet before the timeout, the I2C interface module 200 stops pulling down the I2C clock line 500 level after the timeout, and returns the I2C NAK to the I2C master controller 100.

If the subsequent I2C operation initiated by the I2C master controller 100 is an I2C write operation, the I2C interface module 200 returns an I2C NAK to the I2C master controller 100.

If the subsequent I2C operation initiated by the I2C master controller 100 is an I2C read operation, the I2C interface module 200 returns status information to the I2C master controller 100. In this case, the I2C interface module 200 has not received the write status packet, therefore the status information returned by the I2C interface module 200 to the I2C master controller 100 does not come from the write status packet. The present invention does not specify the status information returned by the I2C interface module 200 to the I2C master controller 100 in this example, but in some embodiments, the status information may include, but is not limited to, the information indicating that the I2C interface module 200 did not receive the write status packet before the timeout.

Figure 9:
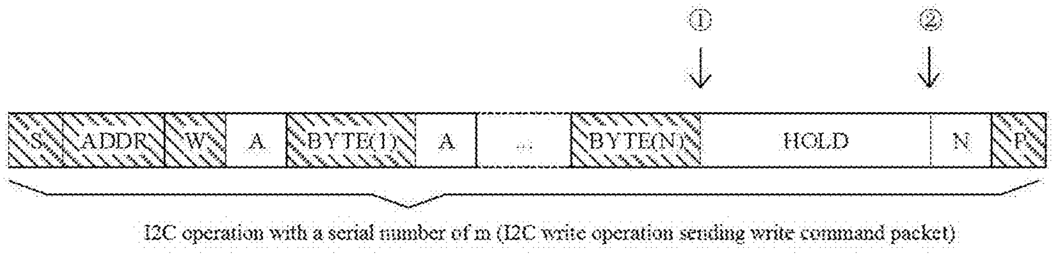
FIG. 9 shows a timing diagram of initiating an I2C write operation to send a write command packet and returning a write status packet to timeout in the first working mode of the data writing method of the present invention.

For example, as shown in FIG. 9, the I2C operation with a serial number of m initiated by the I2C master controller 100 is an I2C write operation, and the I2C master controller 100 sends a write command packet through the I2C write operation. After receiving the write command packet (after receiving BYTE (N)), the I2C interface module 200 pulls down the I2C clock line 500 level at the moment ①, and the I2C interface module 200 continues to wait for the write status packet returned by the functional module 300 to the I2C interface module 200 and the timeout timer performs timing.

When the timer times out at the moment ②, the I2C interface module 200 does not receive the write status packet before the timeout, and after the timeout, the I2C interface module 200 stops pulling down the I2C clock line 500 level, terminates the HOLD state (terminates the continuous low-level state), and returns the I2C NAK to the I2C master controller 100.

For example, as shown in FIGS. 10 and 11, the I2C master controller 100 terminates the I2C operation (I2C write operation) with a serial number of m (in this case, the I2C write operation with a serial number of m is shown in FIG. 9), and the I2C master controller 100 initiates the I2C operation with a serial number of m+1 (subsequent I2C operation). The process of the I2C operation (subsequent I2C operation) initiated by the I2C master controller 100 with a serial number of m+1 is the same as that in the above, and will not be described here again.

Second working mode of the data writing method.

According to an embodiment of the present invention, there is provided an I2C data writing method, which uses the I2C interface system provided by the present invention to write data, including:

an I2C master controller 100 initiates an I2C write operation and sends a write command packet to an I2C interface module 200; after receiving the write command packet, the I2C interface module 200 sends the write command packet to a functional module 300.

The functional module 300 receives the write command packet and executes the write command, and returns a write status packet to the I2C interface module 200 after the functional module 300 completes the write command.

After the I2C interface module 200 receives the write command packet, if the subsequent I2C operation initiated by the I2C master controller 100 is an I2C write operation, and the I2C interface module 200 receives the write status packet returned by the functional module 300 to the I2C interface module 200 and the status information of the write status packet is successful, the I2C interface module 200 receives the subsequent I2C write operation initiated by the I2C master controller 100.

If the subsequent I2C operation initiated by the I2C master controller 100 is an I2C write operation, and the I2C interface module 200 receives the write status packet returned by the functional module 300 to the I2C interface module 200 and the status information of the write status packet is failed, the I2C interface module 200 returns an I2C NAK to the I2C master controller 100.

The write command packet of the present invention is sent by write operation data bytes (BYTE (1), . . . , BYTE (N), which are shaded), and the write command packet includes a write command length field and a write command data field.

Figure 12:
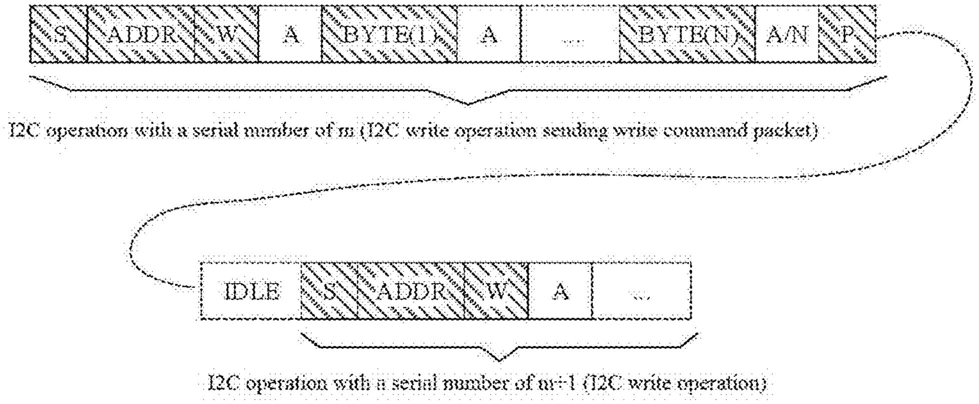
FIG. 12 shows a timing diagram in which an I2C write operation is initiated to send a write command packet and the status information of the write status packet is successful in the second working mode of the data write method of the present invention.
Figure 13:
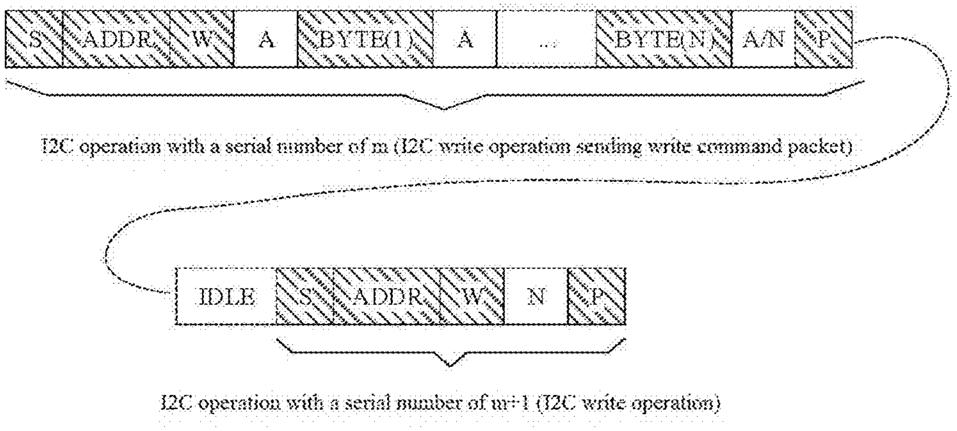
FIG. 13 shows a timing diagram in which an I2C write operation is initiated to send a write command packet and the status information of the write status packet is failed in the second working mode of the data write method of the present invention.

As shown in FIG. 12 and FIG. 13, the I2C operation with a serial number of m initiated by the I2C master controller 100 is an I2C write operation to send a write command packet to the I2C interface module 200. For the first N−1 write operation data bytes (BYTE (1), . . . , BYTE (N−1)), after each write operation data byte is sent, the I2C interface module 200 returns an I2C ACK to the I2C master controller 100.

After the I2C interface module 200 receives the nth write operation data byte (BYTE (N)) (that is, after the I2C interface module 200 receives the complete write command packet), the I2C interface module 200 may return I2C ACK or I2C NAK to the I2C master controller 100, which is specifically selected according to the agreement between the I2C master controller 100 and the I2C interface module 200. It can be agreed between I2C master controller 100 and I2C interface module 200 that whether it is I2C ACK or I2C NAK after the Nth write operation data byte (BYTE (N)), it indicates the successful reception of the Nth write operation data byte (i.e. the complete write command packet), or it can be agreed that I2C NAK indicates that the Nth write operation data byte (BYTE (N)) is not successfully received (i.e. the complete write command packet is not successfully received). In the following description of the present invention, whether the I2C interface module 200 returns I2C ACK or I2C NAK to the I2C master controller 100 after the Nth write operation data byte (BYTE (N)), it indicates the successful reception of the nth write operation data byte (i.e., the complete write command packet).

After the I2C master controller 100 finishes sending the Nth write operation data byte (BYTE (N)), regardless of whether the I2C interface module 200 returns I2C ACK or I2C NAK to the I2C master controller 100, the I2C master controller 100 terminates the I2C operation with a serial number of m (I2C write operation) and can optionally initiate the I2C operation with a serial number of m+1 (a subsequent I2C operation).

When the I2C operation with a serial number of m+1 (subsequent I2C operation) is an I2C write operation, if the I2C interface module 200 receives the write status packet (a corresponding write status packet in the I2C operation with a serial number of m) returned by the functional module 300 to the I2C interface module 200 and the status information of the write status packet is successful, after the I2C master controller 100 sends the write address byte, the I2C interface module 200 returns an I2C ACK to the I2C master controller 100, and the I2C interface module 200 receives the write operation data bytes sent by the I2C operation (subsequent I2C operation/I2C write operation) with a serial number of m+1 initiated by the I2C master controller 100, as shown in FIG. 12.

If the I2C interface module 200 receives the write status packet (a corresponding write status packet in the I2C operation with a serial number of m) returned by the functional module 300 to the I2C interface module 200 and the status information of the write status packet is failed, after the I2C master controller 100 sends the write address byte, the I2C interface module 200 returns the I2C NAK to the I2C master controller 100, and the master controller 100 terminates initiating the m+1 I2C operation (a subsequent I2C operation/I2C write operation), as shown in FIG. 13.

According to an embodiment of the present invention, when the data received by the I2C interface module 200 reaches the length indicated by the write command length field, the I2C interface module 200 receives the write command packet. Specifically, the process of determining that the I2C interface module 200 has received the write command packet is the same as the determination process in the first working mode of the data writing method, and the details are not repeated here.

According to the embodiment of the present invention, the write command packet further includes a write command packet check code. When the data received by the I2C interface module 200 reaches the length indicated by the write command length field and the write command packet check code is verified to be correct, the I2C interface module 200 receives the write command packet. Specifically, the process of determining that the I2C interface module 200 has received the write command packet is the same as the determination process in the first working mode of the data writing method, and the details are not repeated here.

According to the embodiment of the present invention, when the subsequent I2C operation initiated by the I2C master controller 100 is an I2C read operation, the I2C interface module 200 returns the status information of the write status packet to the I2C master controller 100 after receiving the write status packet returned by the functional module 300 to the I2C interface module 200.

Figure 14:
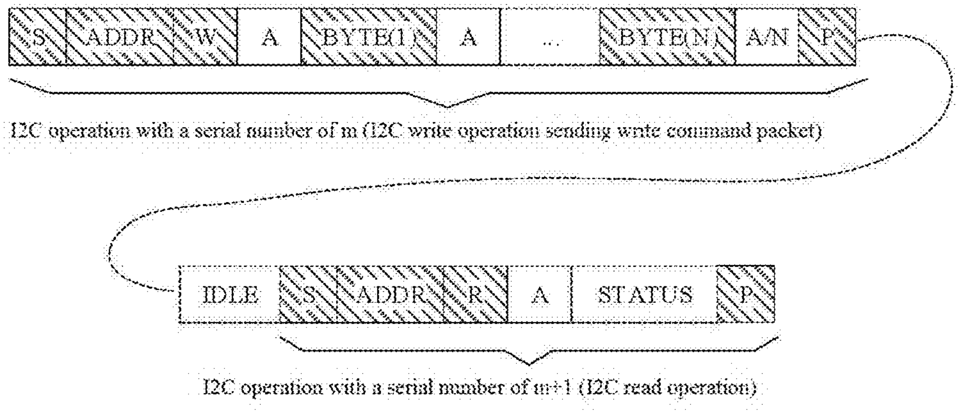
FIG. 14 shows a timing chart of initiating I2C write operation to send a write command packet and the subsequent I2C operation is an I2C read operation in the second working mode of the data writing method of the present invention.

As shown in FIG. 14, the I2C operation with a serial number of m initiated by the I2C master controller 100 sends a write command packet to the I2C interface module 200 for an I2C write operation. For the first N−1 write operation data bytes (BYTE (1), . . . , BYTE (N−1)), after each write operation data byte is sent, the I2C interface module 200 returns an I2C ACK to the I2C master controller 100.

After the I2C interface module 200 receives the Nth write operation data byte (BYTE (N)) (that is, after the I2C interface module 200 receives the complete write command packet), the I2C interface module 200 may return I2C ACK or I2C NAK to the I2C master controller 100.

After the I2C master controller 100 finishes sending the Nth write operation data byte (BYTE (N)), regardless of whether the I2C interface module 200 returns I2C ACK or I2C NAK to the I2C master controller 100, the I2C master controller 100 terminates the I2C operation with a serial number of m (I2C write operation) and can optionally initiate the I2C operation with a serial number of m+1 (a subsequent I2C operation).

When the I2C operation with a serial number of m+1 (subsequent I2C operation) is an I2C read operation, if the I2C interface module 200 receives the write status packet (a corresponding status packet in the I2C operation with a serial number of m) returned by the functional module 300 to the I2C interface module 200, after the I2C master controller 100 sends the read address byte, the I2C interface module 200 returns an I2C ACK to the I2C master controller 100 and returns the status information (STATUS) of the write status packet (the corresponding status packet in the I2C operation with a serial number of m).

According to an embodiment of the present invention, before the data received by the I2C interface module 200 reaches the length indicated by the write command length field, the I2C interface module 200 receives the I2C START signal or the I2C STOP signal, and the I2C interface module 200 terminates the reception of the current write command packet, and the I2C interface module 200 does not receive the write command packet.

If the subsequent I2C operation initiated by the I2C master controller 100 is an I2C write operation, the I2C interface module 200 returns an I2C NAK to the I2C master controller 100.

If the subsequent I2C operation initiated by the I2C master controller 100 is an I2C read operation, the I2C interface module 200 returns status information to the I2C master controller 100.

The process after the I2C master controller 100 initiates the subsequent I2C read operation is the same as that in the first working mode of the data writing method, and will not be described here.

According to the embodiment of the present invention, when the data received by the I2C interface module 200 reaches the length indicated by the write command length field, but the write command packet check code is verified to be incorrect, the I2C interface module 200 ends the reception of the current write command packet, and the I2C interface module 200 does not receive the write command packet.

If the subsequent I2C operation initiated by the I2C master controller 100 is an I2C write operation, the I2C interface module 200 returns an I2C NAK to the I2C master controller 100.

If the subsequent I2C operation initiated by the I2C master controller 100 is an I2C read operation, the I2C interface module 200 returns status information to the I2C master controller 100.

The process after the I2C master controller 100 initiates the subsequent I2C read operation is the same as that in the first working mode of the data writing method, and will not be described here.

According to an embodiment of the present invention, the I2C interface module 200 includes a timeout timer.

The I2C master controller 100 sends a write command packet through I2C write operation, and the I2C interface module 200 sends the write command packet to the functional module 300 after receiving the write command packet. The I2C interface module 200 continuously waits for the write status packet returned by the functional module 300 and the timeout timer performs timing.

When the I2C interface module 200 does not receive the write status packet before the timeout, if the subsequent I2C operation initiated by the I2C master controller 100 is an I2C write operation after the timeout, the I2C interface module 200 returns the I2C NAK to the I2C master controller 100.

When the I2C interface module 200 does not receive the write status packet before the timeout, if the subsequent I2C operation initiated by the I2C master controller 100 is an I2C read operation after the timeout, the I2C interface module 200 returns the status information to the I2C master controller 100.

The process after the I2C master controller 100 initiates the subsequent I2C read operation is the same as that in the first working mode of the data writing method, and will not be described here.

According to an embodiment of the present invention, when the subsequent I2C operation initiated by the I2C master controller 100 is an I2C write operation, if the I2C interface module 200 receives the write status packet returned by the functional module 300 to the I2C interface module 200 and the status information of the write status packet is failed, the I2C interface module 200 returns an I2C NAK to the I2C master controller 100. If the subsequent I2C operation initiated by the I2C master controller 100 is an I2C write operation, the I2C interface module 200 continues to return I2C NAK to the I2C master controller 100. If the subsequent I2C operation initiated by the I2C master controller 100 is an I2C read operation, the I2C interface module 200 returns the status information of the write status packet to the I2C master controller 100, and continues to receive the subsequent I2C operation initiated by the I2C master controller 100 after the I2C read operation.

Figure 15:
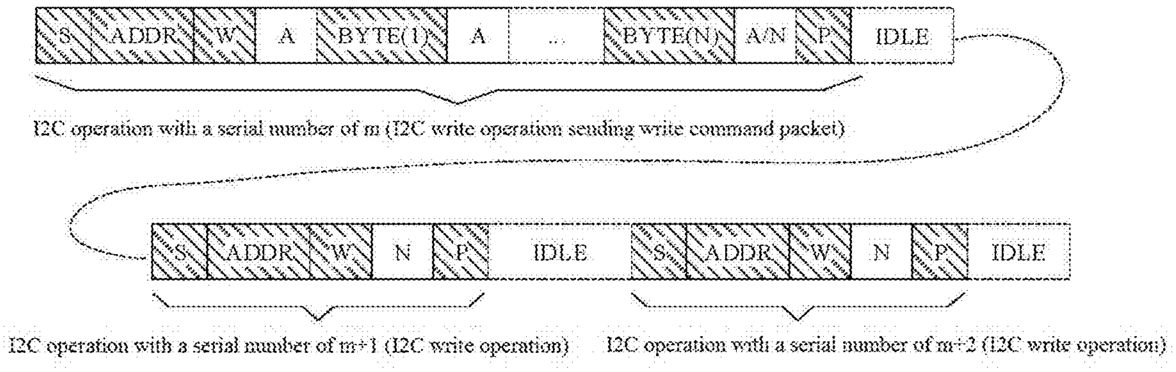
FIG. 15 shows a timing chart of initiating I2C write operation to send a write command packet and the status information of the write status packet is failed, and the subsequent I2C operation is always an I2C write operation in the second working mode of the data write method of the present invention.
Figure 16:
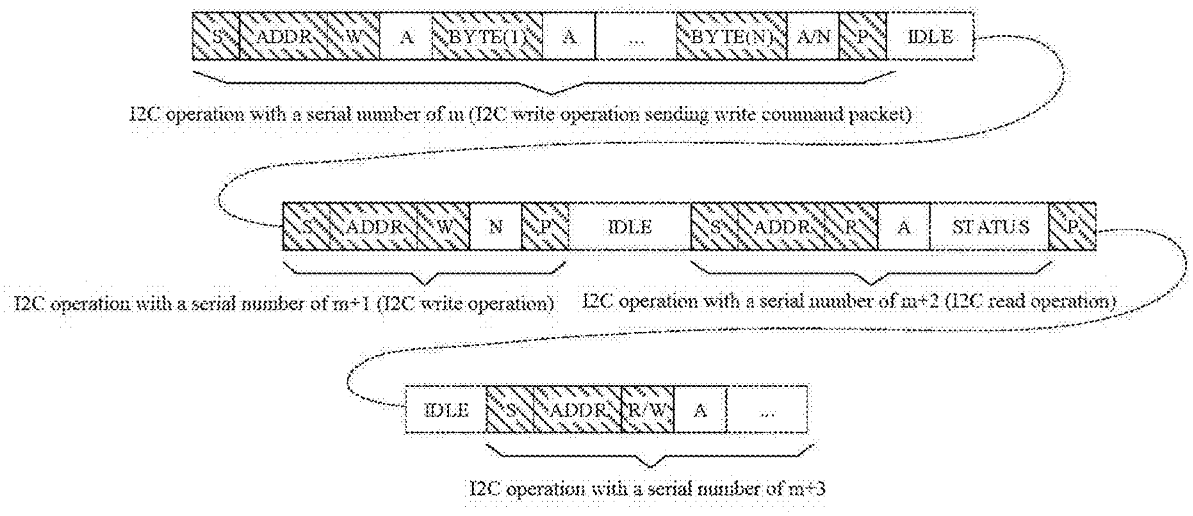
FIG. 16 shows a timing chart of initiating I2C write operation to send a write command packet and the status information of the write status packet is failed, and I2C read operation occurs in the subsequent I2C operation in the second working mode of the data write method of the present invention.

As shown in FIG. 15 and FIG. 16, the I2C operation with a serial number of m initiated by the I2C master controller 100 is an I2C write operation to send a write command packet to the I2C interface module 200. For the first N−1 write operation data bytes (BYTE (1), . . . , BYTE (N−1)), after each write operation data byte is sent, the I2C interface module 200 returns an I2C ACK to the I2C master controller 100.

After the I2C interface module 200 receives the nth write operation data byte (BYTE (N)) (that is, after the I2C interface module 200 receives the complete write command packet), the I2C interface module 200 may return I2C ACK or I2C NAK to the I2C master controller 100.

After the I2C master controller 100 finishes sending the nth write operation data byte (BYTE (N)), regardless of whether the I2C interface module 200 returns I2C ACK or I2C NAK to the I2C master controller 100, the I2C master controller 100 terminates the I2C operation with a serial number of m (I2C write operation) and can optionally initiate the I2C operation with a serial number of m+1 (a subsequent I2C operation).

When the I2C operation with a serial number of m+1 (subsequent I2C operation) is an I2C write operation, if the I2C interface module 200 receives the write status packet (a corresponding status packet in the I2C operation with a serial number of m) returned by the functional module 300 to the I2C interface module 200 and the status information of the write status packet is failed, after the I2C master controller 100 sends the write address byte, the I2C interface module 200 returns an I2C NAK to the I2C master controller 100, and the master controller 100 terminates initializing the I2C operation of m+1 (a subsequent I2C operation/I2C write operation), and the I2C master controller 100 may select to initiate the I2C operation with a serial number of m+2 (a subsequent I2C operation).

If the I2C operation (a subsequent I2C operation) with a serial number of m+2 initiated by the I2C master controller 100 is an I2C write operation, the I2C interface module 200 returns an I2C NAK to the I2C master controller 100, and the master controller 100 terminates initializing the I2C operation of m+2 (a subsequent I2C operation/I2C write operation), as shown in FIG. 15.

If the I2C operation (subsequent I2C operation) initiated by the I2C master controller 100 with a serial number of m+2 is an I2C read operation, after receiving the read address byte, the I2C interface module 200 returns an I2C ACK to the I2C master controller 100, and returns the status information (STATUS) of the write status packet (corresponding status packet during the I2C operation with a serial number of m) to the I2C master controller 100. After the I2C operation with a serial number of m+2 (subsequent I2C operation/I2C read operation), the I2C interface module 200 continues to receive the I2C operation with a serial number of m+3 (a subsequent I2C operation) initiated by the I2C master controller 100 (that is, the I2C interface module 200 returns to I2C ACK after receiving the read address byte or write address byte in the I2C operation with a serial number of m+3 and continues the I2C operation with a serial number of m+3), as shown in FIG. 16.

According to an embodiment of the present invention, when the subsequent I2C operation initiated by the I2C master controller 100 is an I2C write operation, if the I2C interface module 200 does not receive the write status packet returned by the functional module 300 to the I2C interface module 200, the I2C interface module 200 pulls down the I2C clock line 500 level.

If the I2C interface module 200 receives the write status packet returned by the functional module 300 to the I2C interface module 200 and the status information of the write status packet is successful, the I2C interface module 200 stops pulling down the I2C clock line 500 level and receives the subsequent I2C write operation initiated by the I2C master controller 100.

If the I2C interface module 200 receives the write status packet returned by the functional module 300 to the I2C interface module 200 and the status information of the write status packet is failed, the I2C interface module 200 stops pulling down the I2C clock line 500 level and returns the I2C NAK to the I2C master controller 100.

Figure 17:
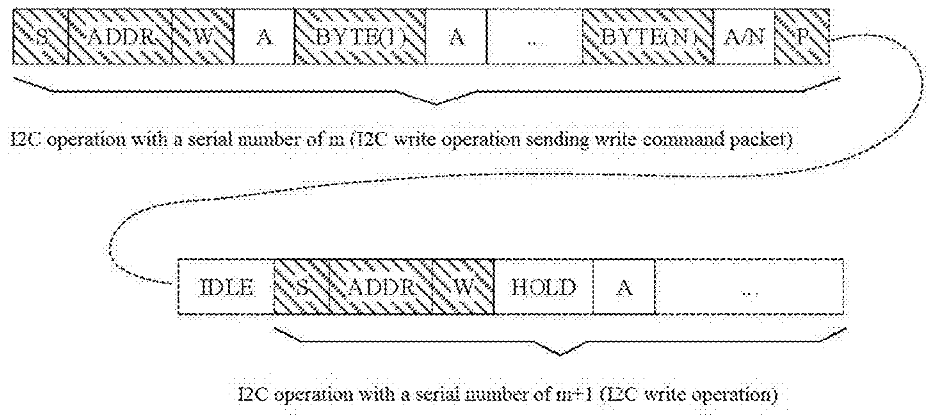
FIG. 17 shows a timing chart when an I2C write operation is initiated and a write command packet is sent, the I2C write operation is received before the returned write status packet is received, and the status information of the write status packet is successful in the second working mode of the data writing method of the present invention.
Figure 18:
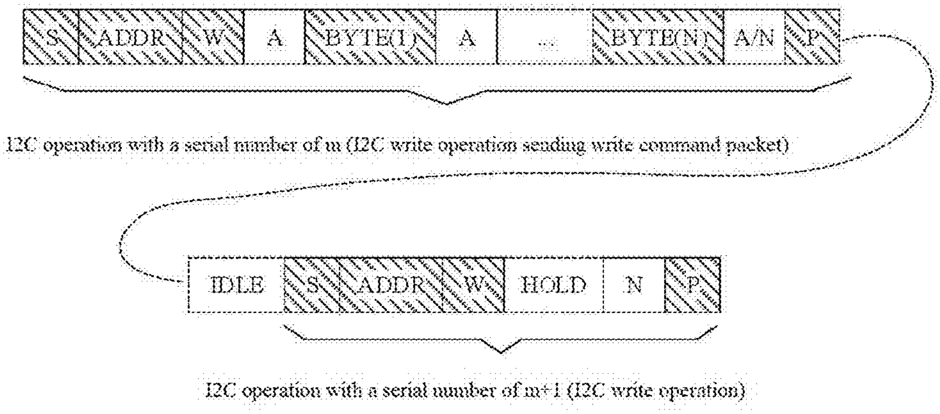
FIG. 18 shows a timing chart when an I2C write operation is initiated and a write command packet is sent, and the I2C write operation is received before the returned write status packet is received, and the status information of the write status packet is failed in the second working mode of the data writing method of the present invention.

As shown in FIG. 17 and FIG. 18, the I2C operation with a serial number of m initiated by the I2C master controller 100 is an I2C write operation to send a write command packet to the I2C interface module 200. For the first N−1 write operation data bytes (BYTE (1), . . . , BYTE (N−1)), after each write operation data byte is sent, the I2C interface module 200 returns an I2C ACK to the I2C master controller 100.

After the I2C interface module 200 receives the nth write operation data byte (BYTE (N)) (that is, after the I2C interface module 200 receives the complete write command packet), the I2C interface module 200 may return I2C ACK or I2C NAK to the I2C master controller 100.

After the I2C master controller 100 finishes sending the nth write operation data byte (BYTE (N)), regardless of whether the I2C interface module 200 returns I2C ACK or I2C NAK to the I2C master controller 100, the I2C master controller 100 terminates the I2C operation with a serial number of m (I2C write operation) and may select to initiate the I2C operation with a serial number of m+1 (a subsequent I2C operation).

When the I2C operation (a subsequent I2C operation) with a serial number of m+1 initiated by the I2C master controller 100 is an I2C write operation, if the I2C interface module 200 does not receive the write status packet (a corresponding write status packet in the I2C operation with a serial number of m) returned by the functional module 300 to the I2C interface module 200, the I2C interface module 200 pulls down the I2C clock line level after receiving the write address byte, and suspends the progress of the I2C operation with a serial number of m+1.

If the I2C interface module 200 receives the write status packet (a corresponding write status packet in the I2C operation with a serial number of m) returned by the functional module 300 to the I2C interface module 200 and the status information of the write status packet is successful, the I2C interface module 200 stops pulling down the I2C clock line 500 level, returns the I2C ACK to the I2C master controller 100, and receives the I2C operation with a serial number of m+1 initiated by the I2C master controller 100 (subsequent I2C operation/I2C write operation), as shown in FIG. 17.

If the I2C interface module 200 receives the write status packet (corresponding write status packet in the I2C operation with a serial number of m) returned by the functional module 300 to the I2C interface module 200 and the status information of the write status packet is failed, the I2C interface module 200 stops pulling down the I2C clock line 500 level and returns an I2C NAK to the I2C master controller 100, and the master controller 100 stops initiating the I2C operation of m+1 (A subsequent I2C operation/I2C write operation), as shown in FIG. 18.

According to an embodiment of the present invention, when the subsequent I2C operation initiated by the I2C master controller 100 is an I2C read operation, if the I2C interface module 200 does not receive the write status packet returned by the functional module 300 to the I2C interface module 200, the I2C interface module 200 pulls down the I2C clock line level.

If the I2C interface module 200 receives the write status packet returned by the functional module 300 to the I2C interface module 200, the I2C interface module 200 stops pulling down the I2C clock line level and returns the status information of the write status packet to the I2C master controller 100.

Figure 19:
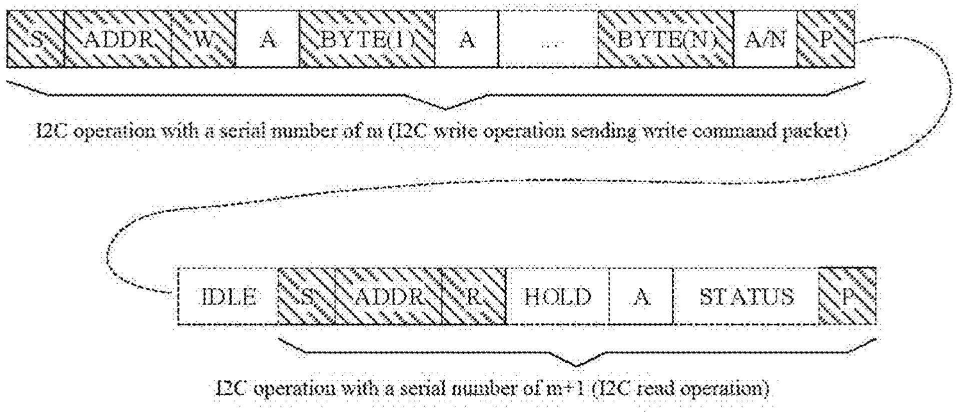
FIG. 19 shows the timing chart of initiating I2C write operation to send write command packet and receiving I2C read operation before receiving the status information of the returned write status packet in the second working mode of the data write method of the present invention.

As shown in FIG. 19, when the I2C operation with a serial number of m initiated by the I2C master controller 100 is an I2C write operation to send a write command packet to the I2C interface module 200, and the I2C operation with a serial number of m+1 initiated by the I2C master controller 100 is an I2C read operation, if the I2C interface module 200 does not receive the write status packet (a corresponding write status packet during the I2C operation with a serial number of m) returned by the functional module 300 to the I2C interface module 200, the I2C interface module 200 pulls down the I2C clock line level.

If the I2C interface module 200 receives the write status packet (a corresponding write status packet in the I2C operation with a serial number of m) returned by the functional module 300 to the I2C interface module 200, the I2C interface module 200 stops pulling down the I2C clock line level, returns I2C ACK to the I2C master controller 100, and returns the status information (STATUS) of the write status packet to the I2C master controller 100.

First working mode of data reading method.

According to an embodiment of the present invention, there is provided an I2C data reading method, which uses the I2C interface system provided by the present invention to read data, including the following steps:

an I2C master controller 100 initiates an I2C write operation to send a read command packet to an I2C interface module 200; the I2C interface module 200 pulls down the I2C clock line level after receiving the read command packet, and sends the read command packet to a functional module 300.

The functional module 300 receives the read command packet and executes the read command. After the functional module 300 completes the read command, it returns a read data packet to the I2C interface module 200, which includes read data.

According to an embodiment of the present invention, read data includes data read from the functional module 300, or read status information generated by the functional module 300 executing a read command, or both data read from the functional module 300 and read status information generated by the functional module 300 executing a read command.

When the I2C interface module 200 receives the read data packet, the I2C interface module 200 stops pulling down the I2C clock line level.

The read command packet of the present invention is transmitted by write operation data bytes (BYTE (1), . . . , BYTE (N), shaded) as shown in FIG. 2, and the read command packet includes a read command length field and a read command data field.

With reference to FIG. 5, in a specific embodiment, the I2C interface module 200 has an I2C address 0x50 with a length of 7 bits (corresponding to the address byte 0xA0 or the binary value of 1010000), and the I2C master controller 100 initiates an I2C write operation to write the I2C interface module 200 with write operation data of a total length of 7 bytes: 0x06, 0x11, 0x21, 0x31, 0x41, 0x51 and 0x61. This 7-byte write operation data contains the read command packet. 0xA0 byte corresponds to the write address byte, with its upper 7 bits corresponding to the I2C address (ADDR) of the I2C interface module 200, and its lower 1 bit being the write operation indication bit (W), and the value of the write operation indication bit (W) is 0, indicating that it is currently a write operation, and the value of this byte is 10100000 in binary, that is, 0xA0 in hexadecimal.

The read command packet includes a read command length field and a read command data field.

0x06 bytes correspond to the read command length field, which is represented by 1 byte in this embodiment, and can be represented by multiple bytes in other embodiments.

Bytes 0x11, 0x21, 0x31, 0x41, 0x51 and 0x61 correspond to the read command data fields. In this embodiment, the read command data fields are 6 bytes in total. When the I2C interface module 200 receives the last bit of 0x61 byte, that is, when the data received by the I2C interface module 200 reaches the length indicated by the read command length field, the I2C interface module 200 receives the read command packet.

In the embodiment shown in FIG. 5, the value of the read command length field (0x06) is equal to the length of the read command data field, and the data received by the I2C interface module 200 reaches the length indicated by the read command length field, which means that the I2C interface module 200 receives all the data of the read command data field until the last byte of the read command data field, the 0x61 byte.

In another embodiment of the present invention, the value of the read command length field can also be predefined to be equal to the length of the read command packet (including the length occupied by the read command length field and the length of the read command data field), and the data received by the I2C interface module 200 reaches the length indicated by the read command length field, which means that the I2C interface module 200 receives all the data of the read command packet (including the read command length field and the read command data field).

The value of the read command length field can also be defined in advance to include some or all of the following data fields: write address byte, read command length field, read command data field, read command packet check code (described below in this document), etc.

The present invention does not limit the content contained in the value of the read command length field, and the preset definition of the content contained in the value of the read command length field only needs to enable the I2C interface module 200 to receive all the data of the read command packet according to the preset definition, and the data received by the I2C interface module 200 reaching the length indicated by the read command length field means that the I2C interface module 200 receives all the data of the read command packet.

In the following embodiments, the length of the read command length field is still one byte, and the value of the read command length field is equal to the length of the read command data field.

In the embodiment shown in FIG. 5, the I2C interface module 200 receives the last bit of 0x61 bytes, that is, when the data received by the I2C interface module 200 reaches the length indicated by the read command length field, the I2C interface module 200 receives the read command packet, pulls down the I2C clock line 500 level, and the I2C bus is in the HOLD state (continuous low level state), and the I2C interface module 200 sends the read command packet to the functional module 300. The functional module 300 receives the read command packet and executes the read command. When the functional module 300 completes the read command, it returns the read data packet to the I2C interface module 200. When the I2C interface module 200 receives the read data packet, the I2C interface module 200 stops pulling down the I2C clock line level.

In the present invention, when the I2C interface module 200 sends the read command packet to the functional module 300, the contents in the read command packet can be modified, added or deleted, and the present invention does not limit or stipulate this. The I2C interface module 200 receives the read data packet, and returns I2C ACK or I2C NAK to the I2C master controller 100 after the I2C interface module 200 stops pulling down the I2C clock line level.

The present invention does not restrict or stipulate that the I2C interface module 200 returns I2C ACK or I2C NAK to the I2C master controller 100 after receiving the read data packet and stopping pulling down the I2C clock line level. As an embodiment, the I2C interface module 200 can choose that when the I2C interface module 200 receives the read data packet and the status information (read data) of the read data packet is successful, the I2C interface module 200 stops pulling down the I2C clock line 500 level and returns an I2C ACK to the I2C master controller 100, and when the I2C interface module 200 receives the read data packet and the status information of the read data packet is failed, the I2C interface module 200 stops pulling down the I2C clock line 500 level and returns an I2C NAK to the I2C master controller 100.

It should be noted that both the write command packet and the read command packet of the present invention are initiated by the I2C master controller 100 and sent to the I2C interface module 200 through write operation data bytes (BYTE (1), . . . , BYTE (N)), and the I2C interface module 200 is only the transmitter of the write command packet or the read command packet, not the final receiver or the command executor. The functional module 300 can identify whether the received command packet is a read command packet or a write command packet. When the functional module 300 identifies that the received command packet is a read command packet, it needs to return a read packet to the I2C interface module 200, and when the functional module 300 identifies that the received command packet is a write command packet, it needs to return a write status packet to the I2C interface module 200.

In a specific embodiment, the I2C master controller 100 initiates an I2C write operation, and after receiving the read command length field (0x06), the I2C interface module 200 can judge that the I2C master controller 100 will sequentially write the read command data fields with a total length of 6 bytes, namely 0x11, 0x21, 0x31, 0x41, 0x51 and 0x61.

According to the embodiment of the present invention, the read command packet further includes a read command packet check code. If the data received by the I2C interface module 200 reaches the length indicated by the read command length field and the check code of the read command packet is verified to be correct, the I2C interface module 200 receives the read command packet.

Specifically, as shown in FIG. 6, a read command packet check code (CRC) of one byte is added to the read command packet. The present invention does not limit the generation algorithm of the read command packet check code, and in some embodiments, the length of the read command packet check code is not limited to one byte. In the following embodiments, a read command packet check code with a length of one byte is exemplarily used, and it is marked by the English abbreviation CRC of cyclic redundancy check code.

The I2C master controller 100 initiates an I2C write operation. After receiving the read command length field (0x06), the I2C interface module 200 can judge that the I2C master controller 100 will sequentially write a read command data field with a length of 6 bytes, namely 0x11, 0x21, 0x31, 0x41, 0x51 and 0x61, and a read command packet check code (CRC) with a length of 1 byte.

After receiving the read command length field (0x06), the I2C interface module 200 counts the bytes of the received read command data field, and after receiving the last byte 0x61 of the read command data field, calculates the read command packet check code (CRC) by using the six bytes of 0x11, 0x21, 0x31, 0x41, 0x51 and 0x61. When the I2C interface module 200 receives the read command packet check code (CRC), it compares the received read command packet check code (CRC) with the calculated read command packet check code. If they are consistent, the data received by the I2C interface module 200 reaches the length indicated by the read command length field, and the read command packet check code is verified to be correct, and the I2C interface module 200 receives the read command packet.

The present invention does not limit the data on which the calculation of the read command packet check code (CRC) is based. For example, other data besides the read command data field can also be used for the calculation of the read command packet check code (CRC), including but not limited to the write address byte, the read command length field and the like.

As shown in FIG. 6, after the I2C interface module 200 receives the read command packet, the I2C interface module 200 pulls down the I2C clock line 500 level, and the I2C bus is in the HOLD state (continuous low level state), and the I2C interface module 200 sends the read command packet to the functional module 300. The functional module 300 receives the read command packet and executes the read command. When the functional module 300 completes the read command, it returns the read data packet to the I2C interface module 200.

According to the embodiment of the present invention, when the I2C interface module 200 receives the read data packet, the I2C interface module 200 stops pulling down the I2C clock line 500 level and returns I2C ACK or I2C NAK to the I2C master controller 100.

If the subsequent I2C operation initiated by the I2C master controller 100 is an I2C write operation, the I2C interface module 200 returns an I2C NAK to the I2C master controller 100.

If the subsequent I2C operation initiated by I2C master controller 100 is an I2C read operation, I2C interface module 200 returns read data to I2C master controller 100.

Figure 20:
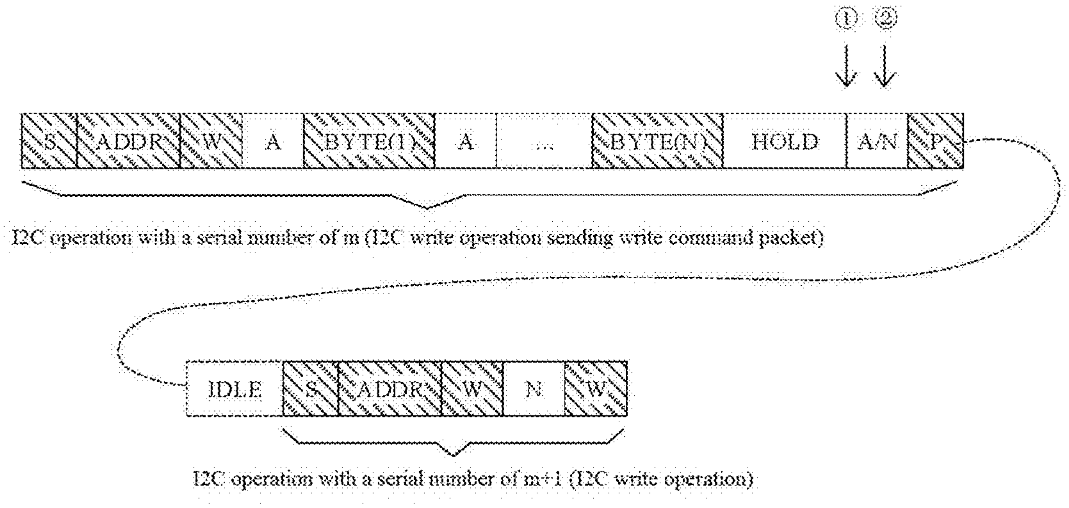
FIG. 20 shows a timing diagram of initiating an I2C write operation to send a read command packet in the first working mode of the data reading method of the present invention, and the subsequent I2C operation is an I2C write operation.
Figure 21:
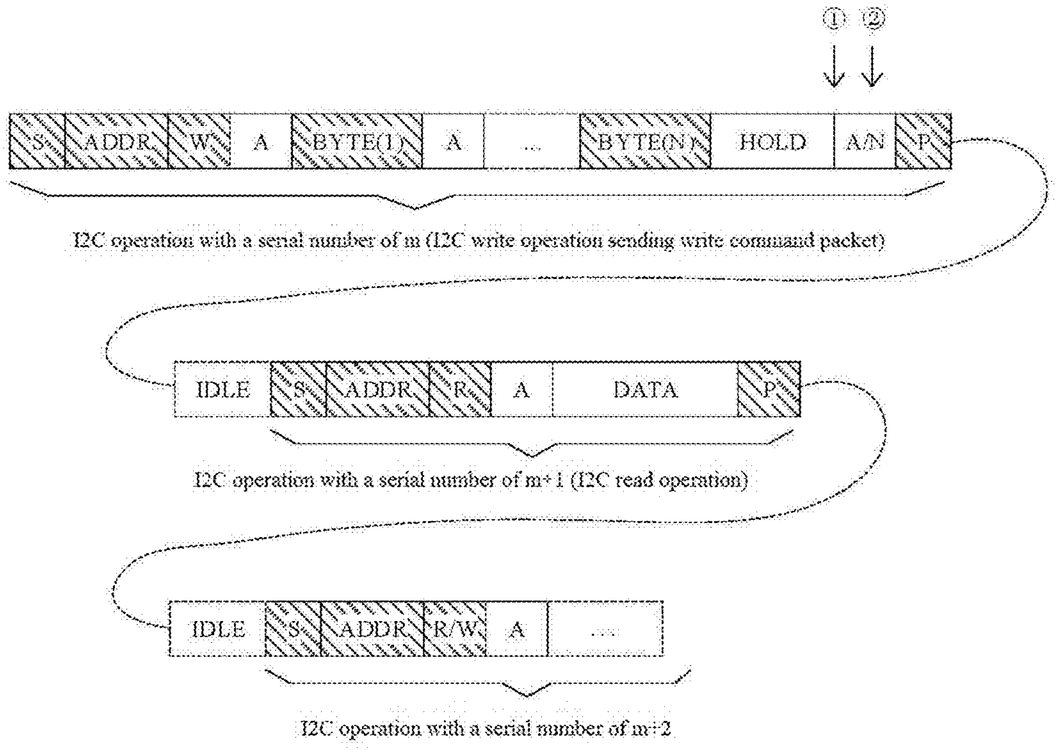
FIG. 21 shows a timing diagram of initiating an I2C write operation to send a read command packet, and the subsequent I2C operation is an I2C read operation in the first working mode of the data reading method of the present invention.

As shown in FIG. 20 and FIG. 21, the I2C master controller 100 initiates an I2C write operation with a serial number of m to send a read command packet to the I2C interface module 200, and the I2C interface module 200 pulls down the I2C clock line 500 level after receiving the read command packet (after receiving BYTE (N)).

At the moment ①, the I2C interface module 200 receives the read data packet, and the I2C interface module 200 stops pulling down the I2C clock line 500 level and terminates the HOLD state (terminating the continuous low state).

At the moment ②, the I2C interface module 200 returns I2C ACK or I2C NAK to the I2C master controller 100, and the I2C master controller 100 terminates the I2C operation with a serial number of m, and the I2C master controller 100 initiates the I2C operation with a serial number of m+1 (a subsequent I2C operation).

If the I2C operation with a serial number of m+1 (a subsequent I2C operation) initiated by the I2C master controller 100 is an I2C write operation, the I2C interface module 200 returns an I2C NAK to the I2C master controller 100 after receiving the write address byte, so that the I2C operation with a serial number of m+1 (a subsequent I2C operation/I2C write operation) is terminated, as shown in FIG. 20.

If the I2C operation with a serial number of m+1 (a subsequent I2C operation) initiated by the I2C master controller 100 is an I2C read operation, after the I2C interface module 200 receives the read address byte, the I2C interface module 200 returns an I2C ACK to the I2C master controller 100 and continues to return the read data (DATA), so that the I2C master controller 100 can continue to perform the I2C operation with a serial number of m+1 (a subsequent I2C operation/I2C read operation).

When the I2C master controller 100 continues to execute the I2C operation with a serial number of m+1 (subsequent I2C operation/I2C read operation), it reads data (DATA), and the I2C interface module 200 continues to receive the I2C operation of m+2 initiated by the I2C master controller 100 after completing the I2C operation with a serial number of m+1 ((a subsequent I2C operation/I2C read operation) (which means that the I2C interface module 200 returns to the I2C ACK after receiving the read address byte or the write address byte in the I2C operation with a serial number of m+2, and continues the I2C operation with the serial number m+2), as shown in FIG. 21.

According to the embodiment of the present invention, if the I2C interface module 200 receives the I2C START signal or the I2C STOP signal before the data received by the I2C interface module 200 reaches the length indicated by the read command length field, the I2C interface module 200 ends the reception of the current read command packet, and the I2C interface module 200 does not receive the read command packet.

If the subsequent I2C operation initiated by the I2C master controller 100 is an I2C write operation, the I2C interface module 200 returns an I2C NAK to the I2C master controller 100.

If the subsequent I2C operation initiated by the I2C master controller 200 is an I2C read operation, the I2C interface module 200 returns status information to the I2C master controller 100. In this embodiment, the I2C interface module 200 has not received the read command packet, therefore the I2C interface module 200 will not send the read command packet to the functional module 300, nor will it receive the read data packet from the functional module 300. Therefore, the status information returned by the I2C interface module 200 to the I2C master controller 100 does not come from the read data packet. The present invention does not specify the status information returned by the I2C interface module 200 to the I2C master controller 100 in this embodiment, but in some embodiments, the status information may include but is not limited to the information indicating that the I2C interface module 200 has not received the read command packet.

According to the embodiment of the present invention, when the data received by the I2C interface module 200 reaches the length indicated by the read command length field, but the check code of the read command packet is verified to be incorrect, the I2C interface module 200 ends the reception of the current read command packet, and the I2C interface module 200 does not receive the read command packet.

If the subsequent I2C operation initiated by the I2C master controller 100 is an I2C write operation, the I2C interface module 200 returns an I2C NAK to the I2C master controller 100.

If the subsequent I2C operation initiated by the I2C master controller 100 is an I2C read operation, the I2C interface module 200 returns status information to the I2C master controller 100. In this embodiment, the I2C interface module 200 has not received the read command packet, therefore the I2C interface module 200 will not send the read command packet to the functional module 300, nor will it receive the read data packet from the functional module 300. Therefore, the status information returned by the I2C interface module 200 to the I2C master controller 100 does not come from the read data packet. The present invention does not specify the status information returned by the I2C interface module 200 to the I2C master controller 100 in this embodiment, but in some embodiments, the status information may include but is not limited to the information indicating that the I2C interface module 200 has not received the read command packet.

According to an embodiment of the present invention, the I2C interface module 200 includes a timeout timer.

The I2C master controller 100 sends a read command packet through an I2C write operation. After receiving the read command packet, the I2C interface module 200 pulls down the I2C clock line 500 level and sends the read command packet to the functional module 300. The I2C interface module 200 continues to wait for the read data packet returned by the functional module 300 and the timeout timer counts.

When the I2C interface module 200 does not receive the read data packet before the timeout, the I2C interface module 200 stops pulling down the I2C clock line level after the timeout, and returns the I2C NAK to the I2C master controller.

If the subsequent I2C operation initiated by I2C master controller 200 is an I2C write operation, I2C interface module 200 returns I2C NAK to I2C master controller 100.

If the subsequent I2C operation initiated by the I2C master controller 100 is an I2C read operation, the I2C interface module 200 returns status information to the I2C master controller 100. In this embodiment the I2C interface module 200 has not received the read data packet, therefore the status information returned by the I2C interface module 200 to the I2C master controller 100 does not come from the read data packet. The present invention does not specify the status information returned by the I2C interface module 200 to the I2C master controller 100 in this embodiment, but in some embodiments, the status information may include, but is not limited to, the information indicating that the I2C interface module 200 did not receive the read data packet before the timeout.

Second working mode of data reading method.

According to an embodiment of the present invention, there is provided an I2C data reading method, which uses the I2C interface system provided by the present invention to read data, including the following steps:

an I2C master controller 100 initiates an I2C write operation to send a read command packet to an I2C interface module 200; after receiving the read command packet, the I2C interface module 200 sends the read command packet to a functional module 300.

The functional module 300 receives the read command packet and executes the read command. After the functional module 300 completes the read command, it returns a read data packet to the I2C interface module 200, which includes read data.

According to an embodiment of the present invention, read data includes data read from the functional module 300, or read status information generated by the functional module 300 executing a read command, or both data read from the functional module 300 and read status information generated by the functional module 300 executing a read command.

After the I2C interface module 200 receives the read command packet, if the subsequent I2C operation initiated by the I2C master controller 100 is an I2C write operation, and the I2C interface module 200 receives the read data packet returned by the functional module 300 to the I2C interface module 200, the I2C interface module 200 returns an I2C NAK to the I2C master controller 100.

If the subsequent I2C operation initiated by I2C master controller 100 is an I2C read operation, and I2C interface module 200 receives the read data packet returned by functional module 300 to an I2C interface module 200, I2C interface module 200 returns the read data to I2C master controller 100.

The read command packet of the present invention is sent through write operation data bytes (BYTE (1), . . . , BYTE (N), which are shaded), and the read command packet includes the number of read command length fields and read command data fields.

Figure 22:
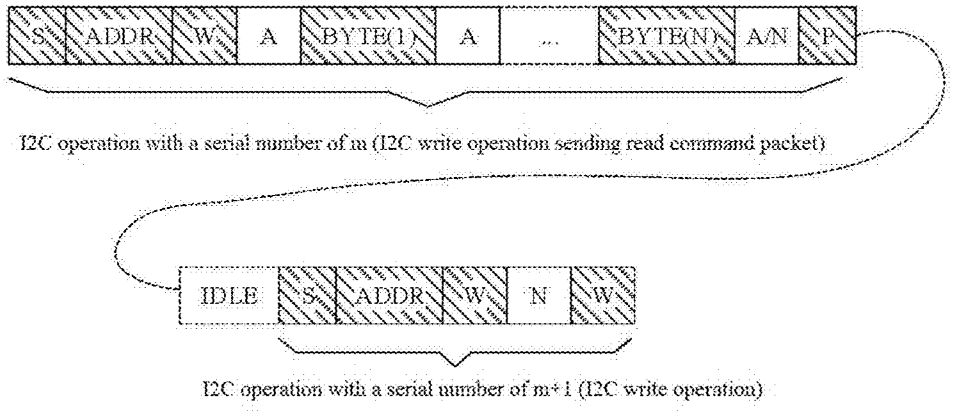
FIG. 22 shows a timing chart of initiating I2C write operation to send a read command packet, and the subsequent I2C operation is an I2C write operation in the second working mode of the data reading method of the present invention.
Figure 23:
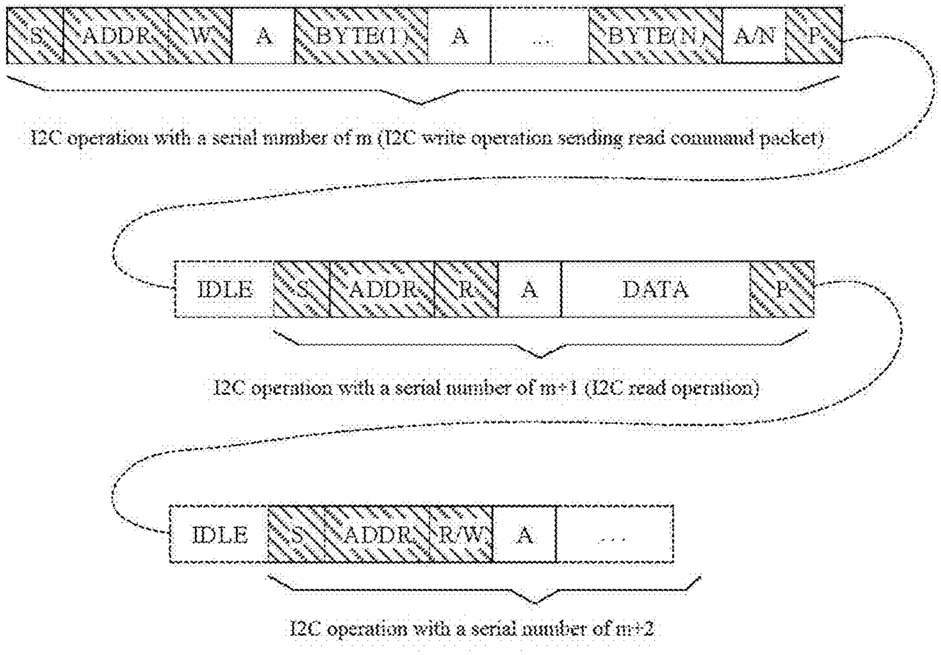
FIG. 23 shows a timing chart of initiating I2C write operation to send a read command packet, and the subsequent I2C operation is I2C read operation in the second working mode of the data reading method of the present invention.

As shown in FIG. 22 and FIG. 23, the I2C operation with a serial number of m initiated by the I2C master controller 100 is an I2C write operation, and the read command packet is sent to the I2C interface module 200. For the first N−1 write operation data bytes (BYTE (1), . . . , BYTE (N−1)), after each write operation data byte is sent, the I2C interface module 200 returns an I2C ACK to the I2C master controller 100.

After the I2C interface module 200 receives the nth write operation data byte (BYTE (N)) (that is, after the I2C interface module 200 receives the complete read command packet), the I2C interface module 200 may return I2C ACK or I2C NAK to the I2C master controller 100, which is selected specifically by the agreement between the I2C master controller 100 and the I2C interface module 200. It can be agreed between I2C master controller 100 and I2C interface module 200 that after the Nth write operation data byte (BYTE (N)), whether it is I2C ACK or I2C NAK, it indicates the successful reception of the nth write operation data byte (i.e. the complete read command packet), or it can be agreed that I2C NAK indicates that the Nth write operation data byte (BYTE (N)) is not successfully received (i.e. the complete read command packet is not successfully received). In the following description of the present invention, whether the I2C interface module 200 returns I2C ACK or I2C NAK to the I2C master controller 100 after the Nth write operation data byte (BYTE (N)), it indicates the successful reception of the Nth write operation data byte (i.e., the complete read command packet). After the I2C master controller 100 finishes sending the data byte (BYTE (N)) of the Nth write operation, regardless of whether the I2C interface module 200 returns I2C ACK or I2C NAK to the I2C master controller 100, the I2C master controller 100 terminates the I2C operation with a serial number of m (I2C write operation) and can choose to continue to initiate the I2C operation with a serial number of m+1 (subsequent I2C operation).

If the I2C operation with a serial number of m+1 (a subsequent I2C operation) is an I2C write operation, and the I2C interface module 200 receives the read data packet (a corresponding read data packet during the I2C operation with a serial number of m) returned by the functional module 300 to the I2C interface module 200, the I2C interface module 200 returns an I2C NAK to the I2C master controller 100 after receiving the write address byte, and the master controller 100 stops initiating the I2C operation with a serial number of m+1 (a subsequent I2C operation)

If the I2C operation with a serial number of m+1 (subsequent I2C operation) is an I2C read operation, and the I2C interface module 200 receives the read data packet (corresponding read data packet during the I2C operation with a serial number of m) returned by the functional module 300 to the I2C interface module 200, the I2C interface module 200 returns an I2C ACK to the I2C master controller 100 after receiving the read address byte, and returns the read data (DATA) to the I2C master controller 100. The I2C master controller can choose to initiate the I2C operation with a serial number of m+2 after the I2C read operation with a serial number of m+1, and the I2C interface module 200 continues to receive the I2C operation with a serial number of m+2 initiated by the I2C master controller 100 after the I2C read operation with a serial number of m+1 (which means that the I2C interface module 200 returns I2C ACK after receiving the read address byte or write address byte in the I2C operation with a serial number of m+2 and continues the I2C operation with a serial number of m+2), as shown in FIG. 23.

According to the embodiment of the present invention, when the data received by the I2C interface module 200 reaches the length indicated by the read command length field, the I2C interface module 200 receives the read command packet. Specifically, the process of determining that the I2C interface module 200 receives the read command packet is the same as the determination process in the first working mode of the data reading method, which is not repeated here.

According to the embodiment of the present invention, the read command packet also includes a read command packet check code. When the data received by the I2C interface module 200 reaches the length indicated by the read command length field and the read command packet check code is verified to be correct, the I2C interface module receives the read command packet. Specifically, the process of determining that the I2C interface module 200 receives the read command packet is the same as that in the first working mode of the data reading method, which is not repeated here.

According to the embodiment of the present invention, before the data received by the I2C interface module 200 reaches the length indicated by the read command length field, the I2C interface module 200 receives the I2C START signal or the I2C STOP signal, therefore the I2C interface module 200 ends the reception of the current read command packet, and the I2C interface module 200 does not receive the read command packet.

If the subsequent I2C operation initiated by the I2C master controller 100 is an I2C write operation, the I2C interface module 200 returns an I2C NAK to the I2C master controller.

If the subsequent I2C operation initiated by the I2C master controller 100 is an I2C read operation, the I2C interface module 200 returns status information to the I2C master controller.

The process after the I2C master controller 100 initiates the subsequent I2C read operation is the same as that in the first working mode of the data reading method, and will not be described here.

According to the embodiment of the present invention, when the data received by the I2C interface module 200 reaches the length indicated by the read command length field, but the check code of the read command packet is verified to be incorrect, the I2C interface module 200 ends the reception of the current read command packet, and the I2C interface module 200 does not receive the read command packet.

If the subsequent I2C operation initiated by the I2C master controller 100 is an I2C write operation, the I2C interface module 200 returns an I2C NAK to the I2C master controller 100.

If the subsequent I2C operation initiated by the I2C master controller 100 is an I2C read operation, the I2C interface module 200 returns status information to the I2C master controller 100.

The process after the I2C master controller 100 initiates the subsequent I2C read operation is the same as that in the first working mode of the data reading method, and will not be described here.

According to an embodiment of the present invention, the I2C interface module 200 includes a timeout timer.

The I2C master controller 100 sends a read command packet through an I2C write operation, and the I2C interface module 200 sends the read command packet to the functional module 300 after receiving the read command packet. The I2C interface module 200 continuously waits for the read data packet returned by the functional module 300 and the timeout timer performs timing.

When the I2C interface module 200 does not receive the read data packet before the timeout, if the subsequent I2C operation initiated by the I2C master controller 100 is an I2C write operation after the timeout, the I2C interface module 200 returns the I2C NAK to the I2C master controller 100.

When the I2C interface module 200 does not receive the read data packet before the timeout, if the subsequent I2C operation initiated by the I2C master controller 100 is an I2C read operation after the timeout, the I2C interface module 200 returns the status information to the I2C master controller 100.

The process after the I2C master controller 100 initiates the subsequent I2C read operation is the same as that in the first working mode of the data reading method, and will not be described here.

Figure 24:
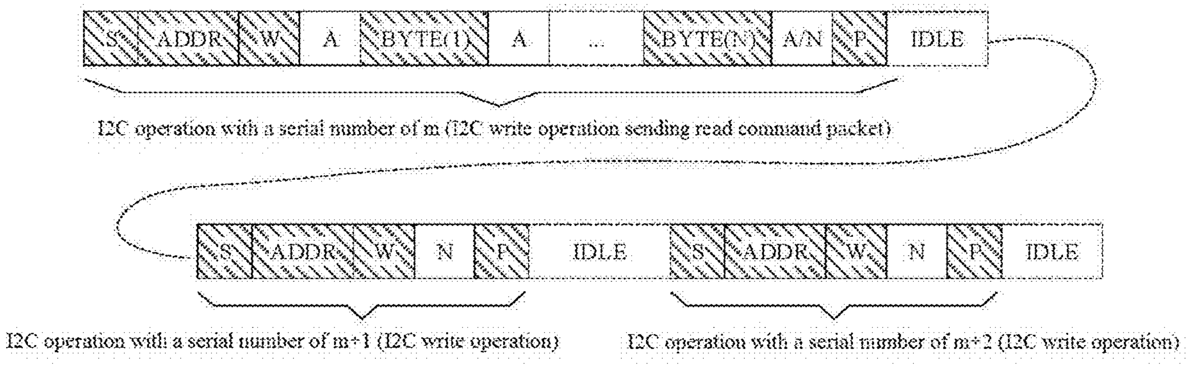
FIG. 24 shows a timing chart of initiating I2C write operation to send a read command packet and the subsequent I2C operation is always an I2C write operation in the second working mode of the data reading method of the present invention.
Figure 25:
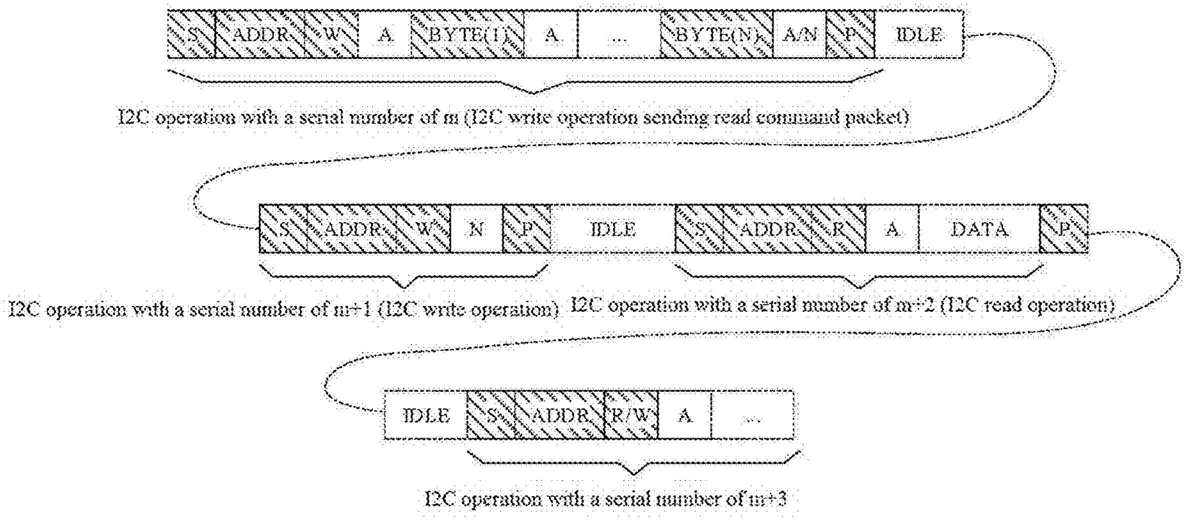
FIG. 25 shows a timing chart of initiating I2C write operation to send a read command packet, and an I2C read operation occurs in the subsequent I2C operation in the second working mode of the data reading method of the present invention.

As shown in FIG. 24 and FIG. 25, the I2C operation with a serial number of m initiated by the I2C master controller 100 is an I2C write operation to send a read command packet to the I2C interface module 200. When the I2C operation with a serial number of m+1 (a subsequent I2C operation) is an I2C write operation, the I2C interface module 200 receives the write address byte and returns the I2C NAK to the I2C master controller 100. The master controller 100 terminates initiating the I2C operation of m+1 (a subsequent I2C operation/I2C write operation), and the I2C master controller 100 initiates the I2C operation with a serial number of m+2 (a subsequent I2C operation).

If the I2C operation (a subsequent I2C operation) with a serial number of m+2 initiated by the I2C master controller 100 is an I2C write operation, the I2C interface module 200 continues to return I2C NAK to the I2C master controller 100, and the master controller 100 terminates initiating the I2C operation of m+2 (a subsequent I2C operation/I2C write operation), as shown in FIG. 24.

If the I2C operation with a serial number of m+2 initiated by the I2C master controller 100 (a subsequent I2C operation) is an I2C read operation, after the I2C interface module 200 receives the read address byte, the I2C interface module 200 returns an I2C ACK to the I2C master controller 100 and continues to return the read data (DATA) contained in the corresponding read data packet during the I2C operation with a serial number of m. The I2C master controller can choose to initiate the I2C operation with a serial number of m+3 after the I2C read operation with a serial number of m+2, and the I2C interface module 200 continues to receive the I2C operation with a serial number of m+3 initiated by the I2C master controller 100 (that is, the I2C interface module 200 returns I2C ACK after receiving the read address byte or write address byte in the I2C operation with a serial number of m+3, and continues the I2C operation with a serial number of m+3), as shown in FIG. 25.

According to an embodiment of the present invention, when the subsequent I2C operation initiated by the I2C master controller 100 is an I2C write operation, if the I2C interface module 200 does not receive the read data packet returned by the functional module 300 to the I2C interface module 200, the I2C interface module pulls down the I2C clock line level.

If the I2C interface module 200 receives the read data packet returned by the functional module 300 to the I2C interface module 200, the I2C interface module 200 stops pulling down the I2C clock line level, and the I2C interface module 200 returns the I2C NAK to the I2C master controller 100.

When the subsequent I2C operation initiated by the I2C master controller 100 is an I2C read operation, if the I2C interface module 200 does not receive the read data packet returned by the functional module 300 to the I2C interface module 100, the I2C interface module 200 pulls down the I2C clock line level.

If the I2C interface module 200 receives the read data packet returned by the functional module 300 to the I2C interface module 200, the I2C interface module 200 stops pulling down the I2C clock line level and returns the read data to the I2C master controller 100.

Figure 26:
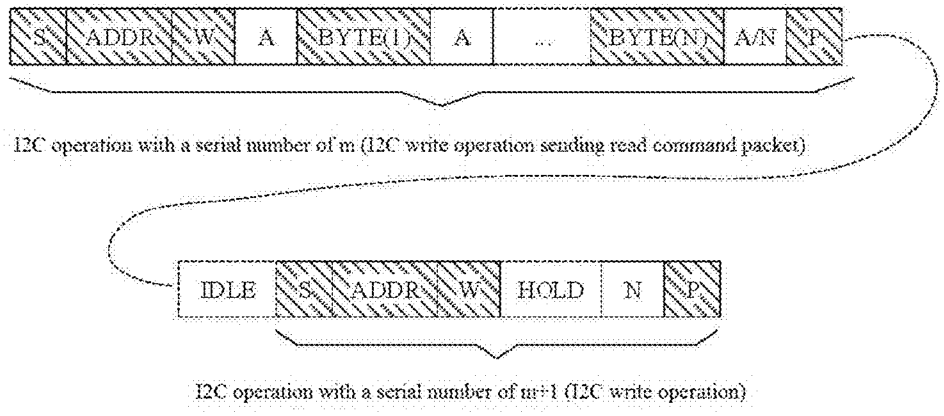
FIG. 26 shows the timing diagram of initiating I2C write operation to send a read command packet and receiving I2C write operation before receiving the returned read packet in the second working mode of the data reading method of the present invention.
Figure 27:
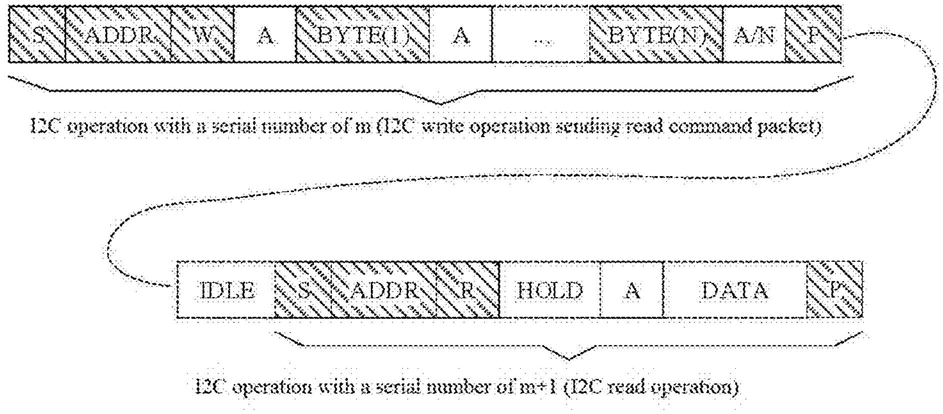
FIG. 27 shows the timing diagram of initiating I2C write operation to send a read command packet and receiving I2C read operation before receiving the returned read packet in the second working mode of the data reading method of the present invention.

As shown in FIG. 26 and FIG. 27, the I2C operation with a serial number of m initiated by the I2C master controller 100 sends a read command packet to the I2C interface module 200 for an I2C write operation. For the first N−1 write operation data bytes (BYTE (1), . . . , BYTE (N−1)), after each write operation data byte is sent, the I2C interface module 200 returns an I2C ACK to the I2C master controller 100.

After the I2C interface module 200 receives the nth write operation data byte (BYTE (N)) (that is, after the I2C interface module 200 receives the complete read command packet), the I2C interface module 200 may return I2C ACK or I2C NAK to the I2C master controller 100.

After the I2C master controller 100 finishes sending the Nth read command data byte (BYTE (N)), regardless of whether the I2C interface module 200 returns I2C ACK or I2C NAK to the I2C master controller 100, the I2C master controller 100 terminates the I2C operation with a serial number of m (I2C write operation) and can choose to continue to initiate the I2C operation with a serial number of m+1 (a subsequent I2C operation).

When the I2C operation (a subsequent I2C operation) with a serial number of m+1 initiated by the I2C master controller 100 is an I2C write operation, if the I2C interface module 200 does not receive the read data packet (corresponding read data packet in the I2C operation with a serial number of m) returned by the functional module 300 to the I2C interface module 200, the I2C interface module 200 pulls down the I2C clock line 500 level after receiving the write address byte, and suspends the progress of the I2C operation with a serial number of m+1 and waits for receiving the read data packet.

If the I2C interface module 200 receives the read data packet (corresponding read data packet in the I2C operation with a serial number of m) returned by the functional module 300 to the I2C interface module 200, the I2C interface module 200 stops pulling down the I2C clock line 500 level, and the I2C interface module 200 returns the I2C NAK to the I2C master controller 100, and the master controller 100 stops initiating the I2C operation of m+1 (subsequent I2C operation/I2C write operation), as shown in FIG. 26.

As shown in FIG. 27, when the I2C operation with a serial number of m initiated by the I2C master controller 100 is an I2C write operation and the I2C operation with a serial number of m+1 initiated by the I2C master controller 100 is an I2C read operation, if the I2C interface module 200 does not receive the read data packet (corresponding read data packet during the I2C operation with a serial number of m) returned by the functional module 300 to the I2C interface module 200, the I2C interface module 200 pulls down the I2C clock line level after receiving the read address byte, suspends the progress of the I2C operation with a serial number of m+1 and waits for receiving the read data packet.

If the I2C interface module 200 receives the read DATA packet (corresponding read DATA packet in the I2C operation with a serial number of m) returned by the functional module 300 to the I2C interface module 200, the I2C interface module 200 stops pulling down the I2C clock line level and returns the I2C ACK and the read data (DATA) contained in the read data packet to the I2C master controller 100, and the I2C master controller 100 terminates the I2C operation with a serial number of m+1 after receiving the read data (DATA).

Although the embodiments of the present invention have been shown and described above, it can be understood that the above-mentioned embodiments are exemplary and cannot be understood as limitations of the present invention, and changes, modifications, substitutions and variations made to the above-mentioned embodiments by those skilled in the art within the scope of the present invention belong to the protection scope of the present invention.

What is claimed is:

1. An I2C data writing method, which uses an I2C interface system to write data, wherein the I2C interface system comprises an I2C interface module and at least one functional module; the I2C interface module is connected with an I2C master controller through an I2C clock line and an I2C data line; the functional module is connected with the I2C interface module;

the I2C data writing method comprises the following steps:

the I2C master controller initiating an I2C write operation and sending a write command packet to the I2C interface module; the I2C interface module pulling down an I2C clock line level after receiving the write command packet, and sending the write command packet to the functional module;

wherein the write command packet includes a write command length field and a write command data field;

the functional module receiving the write command packet and executing a write command, and returning a write status packet to the I2C interface module after the functional module completes the write command;

when the I2C interface module receives the write status packet and the status information of the write status packet is successful, the I2C interface module stopping pulling down the I2C clock line level and returning I2C ACK to the I2C master controller; and when the I2C interface module receives the write status packet and the status information of the write status packet is failed, the I2C interface module stopping pulling down the I2C clock line level and returning I2C NAK to the I2C master controller.

2. The I2C data writing method according to claim 1, wherein, when the data received by the I2C interface module reaches a length indicated by the write command length field, the I2C interface module receiving the write command packet.

3. The I2C data writing method according to claim 1, wherein, the write command packet further includes a write command packet check code;

when the data received by the I2C interface module reaches the length indicated by the write command length field and the write command packet check code is verified to be correct, the I2C interface module receiving the write command packet.

4. The I2C data writing method according to claim 1, wherein, when the I2C interface module receives the write status packet and the status information of the write status packet is successful, the I2C interface module stopping pulling down the I2C clock line level and returning I2C ACK to the I2C master controller, then the I2C interface module continuing to receive a subsequent I2C operation initiated by the I2C master controller.

5. The I2C data writing method according to claim 1, wherein, when the I2C interface module receives the write status packet and the status information of the write status packet is failed, the I2C interface module stopping pulling down the I2C clock line level and returning I2C NAK to the I2C master controller, if the subsequent I2C operation initiated by the I2C master controller is an I2C write operation, the I2C interface module returning I2C NAK to the I2C master controller; and if the subsequent I2C operation initiated by the I2C master controller is an I2C read operation, the I2C interface module returns the status information of the write status packet to the I2C master controller.

6. The I2C data writing method according to claim 2, wherein, before the data received by the I2C interface module reaches the length indicated by the write command length field, the I2C interface module receives the I2C START signal or the I2C STOP signal, then the I2C interface module ends the reception of the current write command packet, and the I2C interface module does not receive the write command packet;

if the subsequent I2C operation initiated by the I2C master controller is an I2C write operation, the I2C interface module returns an I2C NAK to the I2C master controller; and if the subsequent I2C operation initiated by the I2C master controller is an I2C read operation, the I2C interface module returns status information to the I2C master controller.

7. The I2C data writing method according to claim 3, wherein, when the data received by the I2C interface module reaches the length indicated by the write command length field, but the write command packet check code is verified to be incorrect, the I2C interface module ends the reception of the current write command packet, and the I2C interface module does not receive the write command packet;

if the subsequent I2C operation initiated by the I2C master controller is an I2C write operation, the I2C interface module returns an I2C NAK to the I2C master controller; and if the subsequent I2C operation initiated by the I2C master controller is an I2C read operation, the I2C interface module returns status information to the I2C master controller.

8. The I2C data writing method according to claim 1, wherein, the I2C interface module includes a timeout timer;

when the I2C interface module does not receive the write status packet before the timeout, the I2C interface module stops pulling down the I2C clock line level after the timeout, and returns I2C NAK to the I2C master controller;

if the subsequent I2C operation initiated by the I2C master controller is an I2C write operation, the I2C interface module returns I2C NAK to the I2C master controller; and if the subsequent I2C operation initiated by the I2C master controller is an I2C read operation, the I2C interface module returns the status information to the I2C master controller.

9. An I2C data writing method, which uses an I2C interface system to write data, wherein the I2C interface system comprises an I2C interface module and at least one functional module; the I2C interface module is connected with an I2C master controller through an I2C clock line and an I2C data line; the functional module is connected with the I2C interface module;

the I2C data writing method comprises the following steps:

the I2C master controller initiating an I2C write operation and sending a write command packet to the I2C interface module; the I2C interface module sending the write command packet to the functional module after receiving the write command packet;

wherein the write command packet includes a write command length field and a write command data field;

the functional module receiving the write command packet and executing a write command, and returning a write status packet to the I2C interface module after the functional module completes the write command;

after the I2C interface module receives the write command packet, if a subsequent I2C operation initiated by the I2C master controller is an I2C write operation, and the I2C interface module receives the write status packet returned by the functional module to the I2C interface module and the status information of the write status packet is successful, the I2C interface module receiving the subsequent I2C write operation initiated by the I2C master controller; and if the subsequent I2C operation initiated by the I2C master controller is an I2C write operation, and the I2C interface module receives the write status packet returned by the functional module to the I2C interface module and the status information of the write status packet is failed, the I2C interface module returning I2C NAK to the I2C master controller.

10. The I2C data writing method according to claim 9, wherein when the data received by the I2C interface module reaches the length indicated by the write command length field, the I2C interface module receives the write command packet.

11. The I2C data writing method according to claim 9, wherein, the write command packet further includes a write command packet check code;

when the data received by the I2C interface module reaches the length indicated by the write command length field and the write command packet check code is verified to be correct, the I2C interface module receives the write command packet.

12. The I2C data writing method according to claim 9, wherein, when the subsequent I2C operation initiated by the I2C master controller is an I2C read operation, after the I2C interface module receives the write status package returned by the functional module to the I2C interface module, the I2C interface module returns the status information of the write status package to the I2C master controller.

13. The I2C data writing method according to claim 10, wherein, before the data received by the I2C interface module reaches the length indicated by the write command length field, the I2C interface module receives an I2C START signal or an I2C STOP signal, then the I2C interface module ends the reception of the current write command packet, and the I2C interface module does not receive the write command packet;

if the subsequent I2C operation initiated by the I2C master controller is an I2C write operation, the I2C interface module returns I2C NAK to the I2C master controller; and if the subsequent I2C operation initiated by the I2C master controller is an I2C read operation, the I2C interface module returns status information to the I2C master controller.

14. The I2C data writing method according to claim 11, wherein, when the data received by the I2C interface module reaches the length indicated by the write command length field, but the write command packet check code is verified to be incorrect, the I2C interface module ends the reception of the current write command packet, and the I2C interface module does not receive the write command packet;

if the subsequent I2C operation initiated by the I2C master controller is an I2C write operation, the I2C interface module returns I2C NAK to the I2C master controller; and if the subsequent I2C operation initiated by the I2C master controller is an I2C read operation, the I2C interface module returns status information to the I2C master controller.

15. The I2C data writing method according to claim 9, wherein, the I2C interface module includes a timeout timer;

when the I2C interface module does not receive the write status packet before the timeout, if the subsequent I2C operation initiated by the I2C master controller is an I2C write operation after the timeout, the I2C interface module returns I2C NAK to the I2C master controller; and when the I2C interface module does not receive the write status packet before the timeout, if the subsequent I2C operation initiated by the I2C master controller is an I2C read operation after the timeout, the I2C interface module returns status information to the I2C master controller.

16. The I2C data writing method according to claim 9, wherein, when a subsequent I2C operation initiated by the I2C master controller is an I2C write operation, if the I2C interface module does not receive the write status packet returned by the functional module to the I2C interface module, the I2C interface module pulls down the I2C clock line level;

if the I2C interface module receives the write status packet returned by the functional module to the I2C interface module and the status information of the write status packet is successful, the I2C interface module stops pulling down the I2C clock line level and receives the subsequent I2C write operation initiated by the I2C master controller; and if the I2C interface module receives the write status packet returned by the functional module to the I2C interface module and the status information of the write status packet is failed, the I2C interface module stops pulling down the I2C clock line level and returns I2C NAK to the I2C master controller.

17. The I2C data writing method according to claim 9, wherein, when the subsequent I2C operation initiated by the I2C master controller is an I2C read operation, if the I2C interface module does not receive the write status packet returned by the functional module to the I2C interface module, the I2C interface module pulls down the I2C clock line level; and if the I2C interface module receives the write status package returned by the functional module to the I2C interface module, the I2C interface module stops pulling down the I2C clock line level and returns the status information of the write status package to the I2C master controller.

18. An I2C data reading method, which uses an I2C interface system to read data, wherein the I2C interface system comprises an I2C interface module and at least one functional module; the I2C interface module is connected with an I2C master controller through an I2C clock line and an I2C data line; the functional module is connected with the I2C interface module;

the I2C data reading method comprises the following steps:

the I2C master controller initiating an I2C write operation and sending a read command packet to the I2C interface module; the I2C interface module pulling down an I2C clock line level after receiving the read command packet, and sending the read command packet to the functional module;

wherein the read command packet includes a read command length field and a read command data field;

the functional module receiving the read command packet and executing a read command, and returning a read data packet to the I2C interface module after the functional module completes the read command; wherein the read data packet includes read data; and when the I2C interface module receives the read data packet, the I2C interface module stopping pulling down the I2C clock line level.

19. The I2C data reading method according to claim 18, wherein, when the data received by the I2C interface module reaches the length indicated by the read command length field, the I2C interface module receives the read command packet.

20. The I2C data reading method according to claim 18, wherein, the read command packet further includes a read command packet check code; and when the data received by the I2C interface module reaches the length indicated by the read command length field and the check code of the read command packet is verified to be correct, the I2C interface module receives the read command packet.

21. The I2C data reading method according to claim 18, wherein, when the I2C interface module receives the read data packet, the I2C interface module stops pulling down the I2C clock line level and returns I2C ACK or I2C NAK to the I2C master controller;

if the subsequent I2C operation initiated by the I2C master controller is an I2C write operation, the I2C interface module returns I2C NAK to the I2C master controller;

if a subsequent I2C operation initiated by the I2C master controller is an I2C read operation, the I2C interface module returns read data to the I2C master controller.

22. The I2C data reading method according to claim 19, wherein, before the data received by the I2C interface module reaches the length indicated by the read command length field, the I2C interface module receives an I2C START signal or tan I2C STOP signal, then the I2C interface module ends the reception of the current read command packet, and the I2C interface module does not receive the read command packet;

if the subsequent I2C operation initiated by the I2C master controller is an I2C write operation, the I2C interface module returns I2C NAK to the I2C master controller; and if the subsequent I2C operation initiated by the I2C master controller is an I2C read operation, the I2C interface module returns status information to the I2C master controller.

23. The I2C data reading method according to claim 20, wherein, when the data received by the I2C interface module reaches the length indicated by the read command length field, but the check code of the read command packet is verified to be incorrect, the I2C interface module ends the reception of the current read command packet, and the I2C interface module does not receive the read command packet;

if the subsequent I2C operation initiated by the I2C master controller is an I2C write operation, the I2C interface module returns I2C NAK to the I2C master controller; and if the subsequent I2C operation initiated by the I2C master controller is an I2C read operation, the I2C interface module returns status information to the I2C master controller.

24. The I2C data reading method according to claim 18, wherein, the I2C interface module includes a timeout timer;

when the I2C interface module does not receive the read data packet before the timeout, after the timeout, the I2C interface module stops pulling down the I2C clock line level and returns I2C NAK to the I2C master controller;

if the subsequent I2C operation initiated by the I2C master controller is an I2C write operation, the I2C interface module returns I2C NAK to the I2C master controller; and if the subsequent I2C operation initiated by the I2C master controller is an I2C read operation, the I2C interface module returns status information to the I2C master controller.

25. The I2C data reading method according to claim 18, wherein, the read data includes data read from the functional module, or read status information generated by the functional module executing the read command, or both data read from the functional module and read status information generated by the functional module executing the read command.

26. An I2C data reading method, which uses an I2C interface system to read data, wherein the I2C interface system comprises an I2C interface module and at least one functional module; the I2C interface module is connected with an I2C master controller through an I2C clock line and an I2C data line; the functional module is connected with the I2C interface module;

the I2C data reading method comprises the following steps:

an I2C master controller initiating an I2C write operation and sending a read command packet to an I2C interface module; the I2C interface module sending the read command packet to a functional module after receiving the read command packet;

wherein the read command packet includes a read command length field and a read command data field;

the functional module receiving the read command packet and executing a read command, and returning a read data packet to the I2C interface module after the functional module completes the read command; wherein the read data packet includes read data;

after the I2C interface module receives the read command packet, if the subsequent I2C operation initiated by the I2C master controller is an I2C write operation, and the I2C interface module receives the read data packet returned by the functional module to the I2C interface module, the I2C interface module returning an I2C NAK to the I2C master controller; and if the subsequent I2C operation initiated by the I2C master controller is an I2C read operation, and the I2C interface module receives the read data packet returned by the functional module to the I2C interface module, the I2C interface module returning the read data to the I2C master controller.

27. The I2C data reading method according to claim 26, wherein, when the data received by the I2C interface module reaches the length indicated by the read command length field, the I2C interface module receives the read command packet.

28. The I2C data reading method according to claim 26, wherein, the read command packet further includes a read command packet check code; and when the data received by the I2C interface module reaches the length indicated by the read command length field and the check code of the read command packet is verified to be correct, the I2C interface module receives the read command packet.

29. The I2C data reading method according to claim 27, wherein, before the data received by the I2C interface module reaches the length indicated by the read command length field, the I2C interface module receives an I2C START signal or an I2C STOP signal, then the I2C interface module ends the reception of the current read command packet, and the I2C interface module does not receive the read command packet;

if a subsequent I2C operation initiated by the I2C master controller is an I2C write operation, the I2C interface module returns I2C NAK to the I2C master controller; and if the subsequent I2C operation initiated by the I2C master controller is an I2C read operation, the I2C interface module returns status information to the I2C master controller.

30. The I2C data reading method according to claim 28, wherein, when the data received by the I2C interface module reaches the length indicated by the read command length field, but the check code of the read command packet is verified to be incorrect, the I2C interface module ends the reception of the current read command packet, and the I2C interface module does not receive the read command packet;

if the subsequent I2C operation initiated by the I2C master controller is an I2C write operation, the I2C interface module returns I2C NAK to the I2C master controller; and if the subsequent I2C operation initiated by the I2C master controller is an I2C read operation, the I2C interface module returns status information to the I2C master controller.

31. The I2C data reading method according to claim 26, wherein, the I2C interface module includes a timeout timer;

when the I2C interface module does not receive the read data packet before the timeout, if the subsequent I2C operation initiated by the I2C master controller is an I2C write operation after the timeout, the I2C interface module returns I2C NAK to the I2C master controller; and when the I2C interface module does not receive the read data packet before the timeout, if the subsequent I2C operation initiated by the I2C master controller is an I2C read operation after the timeout, the I2C interface module returns the status information to the I2C master controller.

32. The I2C data reading method according to claim 26, wherein, the read data includes data read from the functional module, or read status information generated by the functional module executing the read command, or both data read from the functional module and read status information generated by the functional module executing the read command.

33. The I2C data reading method according to claim 26, wherein, when the subsequent I2C operation initiated by the I2C master controller is an I2C write operation, if the I2C interface module does not receive the read data packet returned by the functional module to the I2C interface module, the I2C interface module pulls down the I2C clock line level; and if the I2C interface module receives the read data packet returned by the functional module to the I2C interface module, the I2C interface module stops pulling down the I2C clock line level, and the I2C interface module returns I2C NAK to the I2C master controller.

34. The I2C data reading method according to claim 26, wherein, when the subsequent I2C operation initiated by the I2C master controller is an I2C read operation, if the I2C interface module does not receive the read data packet returned by the functional module to the I2C interface module last time, the I2C interface module pulls down the I2C clock line level; and if the I2C interface module receives the read data packet returned by the functional module to the I2C interface module, the I2C interface module stops pulling down the I2C clock line level and returns the read data to the I2C master controller.

* * * * *